US012754276B2

(12) United States Patent
Manolakos et al.

(10) Patent No.: US 12,754,276 B2
(45) Date of Patent: Oct. 6, 2026

(54) POSITIONING RESOURCE MEASUREMENT AND REPORTING PRIORITIZATION BASED ON ASSOCIATED REFLECTION OBJECTS

(71) Applicant: QUALCOMM Incorporated, San Diego, CA (US)

(72) Inventors: Alexandros Manolakos, Athens (GR); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 18/704,008

(22) PCT Filed: Nov. 4, 2022

(86) PCT No.: PCT/US2022/049055
§ 371 (c)(1),
(2) Date: Apr. 23, 2024

(87) PCT Pub. No.: WO2023/113935
PCT Pub. Date: Jun. 22, 2023

(65) Prior Publication Data
US 2024/0426963 A1 Dec. 26, 2024

(30) Foreign Application Priority Data
Dec. 14, 2021 (GR) .............................. 20210100874

(51) Int. Cl.
*G01S 5/02* (2010.01)

(52) U.S. Cl.
CPC .......... *G01S 5/0244* (2020.05); *G01S 5/0236* (2013.01); *G01S 5/0273* (2013.01)

(58) Field of Classification Search
CPC .... G01S 5/0244; G01S 5/0236; G01S 5/0273; H04L 5/0035; H04L 5/0048;
(Continued)

(56) References Cited

U.S. PATENT DOCUMENTS 10,551,477 B2 * 2/2020 Kumar .................. G01S 5/0236
11,381,935 B2 * 7/2022 Krainikov .............. A61G 5/127
(Continued)

FOREIGN PATENT DOCUMENTS

KR 20230011305 A * 1/2023 ........... H04L 5/0048
WO WO-2016163943 A1 * 10/2016 ............... G01S 5/10
(Continued)

OTHER PUBLICATIONS

3GPP TS 38.214, "3rd Generation Partnership Project; Technical Specification Group Radio Access Network; NR; Physical layer procedures for data (Release 16) ", 3GPP Standard, Technical Specification, 3GPP TS 38.214, V16.7.0, 3rd Generation Partnership Project, Mobile Competence Centre, 650, Route Des Lucioles, F-06921 Sophia-Antipolis Cedex, France, vol. RAN WG1, No. V16.7.0, Sep. 28, 2021, pp. 1-172, XP052056880, Section 5.1.6.5.
(Continued)

*Primary Examiner* — Mahendra R Patel
(74) *Attorney, Agent, or Firm* — Thien T. Nguyen

(57) ABSTRACT

A user equipment (UE) receives positioning assistance data including one or more Positioning Reference Signal (PRS) resources, PRS resource sets, and TRPs, and information related to one or more Reflection Objects (ROs), such as Reconfiguration Intelligent Surfaces (RISs). A prioritization of PRS signals and/or ROs for measurement and/or reporting is based at least on the information for the one or more ROs. For example, prioritization may be determined based on whether an RO is reflecting PRS signals that will enhance positioning performance for the UE. Accuracy requirements for positioning or measurement may similarly be determined based at least in part on associate of the RO with PRS resources. Measurement of the PRS signals and/or reporting of the measurements is performed based on the prioritization of the PRS signals and/or ROs.

38 Claims, 15 Drawing Sheets

(58) Field of Classification Search
CPC .... H04L 5/0064; H04W 64/00; H04W 24/08; H04W 24/10; H04B 7/04013
USPC ........................................................ 455/456.1
See application file for complete search history.

(56) References Cited

U.S. PATENT DOCUMENTS

| | | | | | |
|---|---|---|---|---|---|
| 11,402,462 | B2 * | 8/2022 | Driscoll | G01S 13/424 | |
| 12,127,013 | B2 * | 10/2024 | Ali et al. | H04B 7/088 | |
| 2013/0166202 | A1 * | 6/2013 | Bandyopadhyay | G01S 19/48 | 701/501 |
| 2018/0124787 | A1 * | 5/2018 | Wang et al. | G01S 5/0236 | |
| 2021/0360570 | A1 | 11/2021 | Manolakos et al. | | |
| 2022/0248366 | A1 * | 8/2022 | Bao | H04W 64/006 | |
| 2023/0247671 | A1 * | 8/2023 | Manolakos | H04L 5/0048 | 370/329 |

FOREIGN PATENT DOCUMENTS

| | | | | |
|---|---|---|---|---|
| WO | WO-2020096506 A1 * | 5/2020 | G01S 5/0273 |
| WO | 2021030628 A1 | 2/2021 | |
| WO | WO-2022055683 A1 * | 3/2022 | G01S 13/876 |
| WO | WO-2022074118 A1 * | 4/2022 | H04L 5/0048 |
| WO | 2023288151 A1 | 1/2023 | |

OTHER PUBLICATIONS

Huawei, et al., "CR on Accuracy Requirements for Positioning Measurement R17", 3GPP TSG-RAN4 Meeting #101-e, R4-2119334, 3rd Generation Partnership Project (3GPP), Mobile Competence Centre, 650, Route Des Lucioles, F-06921 Sophia-Antipolis Cedex, France, vol. RAN WG4, No. Electronic Meeting, Nov. 1, 2021-Nov. 12, 2021, 6 Pages, Nov. 16, 2021 (Nov. 16, 2021), XP052077530, the whole document.

International Search Report and Written Opinion—PCT/US2022/049055—ISA/EPO—May 12, 2023.

Moderator (Intel Corporation): "Summary of the E-mail Discussion [105-e-NR-Pos-01] on Rel.16 NR Positioning Maintenance", 3GPP TSG RAN WG1 #105-e, R1-2106020, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 28, 2021, 10 Pages, XP052015703, The whole document.

Partial International Search Report—PCT/US2022/049055—ISA/EPO—Mar. 9, 2023.

European Search Report—EP24223838—Search Authority—Munich—Feb. 11, 2025.

* cited by examiner

POSITIONING RESOURCE MEASUREMENT AND REPORTING PRIORITIZATION BASED ON ASSOCIATED REFLECTION OBJECTS

CROSS REFERENCE TO RELATED APPLICATIONS

This application is a National Stage Application filed under 35 U.S.C. § 371 of PCT International Application Serial No. PCT/US2022/049055 entitled "POSITIONING RESOURCE MEASUREMENT AND REPORTING PRIORITIZATION BASED ON ASSOCIATED REFLECTION OBJECTS" and filed on Nov. 4, 2022, which claims the benefit of Greek application No. 20210100874, entitled "METHODS AND APPARATUS FOR POSITIONING RESOURCE MEASUREMENT AND REPORTING PRIORITIZATION BASED ON ASSOCIATED REFLECTION OBJECTS" and filed on Dec. 14, 2021, which are expressly incorporated by reference herein in their entirety.

TECHNICAL FIELD

Aspects of the disclosure relate generally to positioning for user equipment (UE), and in particular for prioritization positioning reference signal measurements and/or reporting during positioning.

INTRODUCTION

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

A UE may determine a location estimate or assist in determining a location estimate using positioning references signals it receives. To assist a UE in determining which signals to seek for positioning, a network may provide the UE with positioning assistance data containing information that will aid in detecting and measuring positioning reference signals.

BRIEF SUMMARY

A user equipment (UE) receives positioning assistance data including one or more Positioning Reference Signal (PRS) resources, PRS resource sets, and TRPs, and information related to one or more Reflection Objects (ROs), such as Reconfiguration Intelligent Surfaces (RISs). A prioritization of PRS signals and/or ROs for measurement and/or reporting is based at least on the information for the one or more ROs. For example, prioritization may be determined based on whether an RO is reflecting PRS signals that will enhance positioning performance for the UE. Accuracy requirements for positioning or measurement may similarly be determined based at least in part on associate of the RO with PRS resources. Measurement of the PRS signals and/or reporting of the measurements is performed based on the prioritization of the PRS signals and/or ROs.

In one implementation, a method performed by a user equipment (UE) in a wireless network for position determination of the UE, includes receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and performing PRS measurements or reporting the PRS measurements or a combination thereof based on at least the prioritization of the PRS signals.

In one implementation, a user equipment (UE) in a wireless network configured for position determination of the UE, includes a wireless transceiver configured to wirelessly communicate with entities in a wireless network; at least one memory; and at least one processor coupled to the wireless transceiver and the at least one memory and configured to: receive, via the wireless transceiver, positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and perform PRS measurements or reporting the PRS measurements or a combination thereof based on at least the prioritization of the PRS signals.

In one implementation, a user equipment (UE) in a wireless network configured for position determination of the UE, includes means for receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and means for performing PRS measurements or reporting the PRS measurements or a combination thereof based on at least the prioritization of the PRS signals.

In one implementation, a non-transitory computer-readable storage medium including program code stored thereon, the program code is operable to configure at least one processor in a user equipment (UE) in a wireless network for position determination of the UE, the program code comprising instructions to: receive positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and perform PRS measurements or reporting the PRS measurements or a combination thereof based on at least the prioritization of the PRS signals.

In one implementation, a method performed by a location server in a wireless network for position determination of a user equipment (UE), includes sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receiving a report of measurements of PRS signals from the UE, wherein at least one of the measurements of the PRS signals performed by the UE, the report of the measurements of the PRS signals, or a combination thereof are prioritized based at least on the prioritization of the PRS signals.

In one implementation, a location server in a wireless network configured for position determination of a user equipment (UE), includes an external interface transceiver configured to wirelessly communicate with entities in a wireless network; at least one memory; and at least one processor coupled to the external interface and the at least one memory and configured to: send, via the external interface, positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receive, via the external interface, a report of measurements of PRS signals from the UE, wherein at least one of the measurements of the PRS signals performed by the UE, the report of the measurements of the PRS signals, or a combination thereof are prioritized based at least on the prioritization of the PRS signals.

In one implementation, a location server in a wireless network configured for position determination of a user equipment (UE), includes means for sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and means for receiving a report of measurements of PRS signals from the UE, wherein at least one of the measurements of the PRS signals performed by the UE, the report of the measurements of the PRS signals, or a combination thereof are prioritized based at least on the prioritization of the PRS signals.

In one implementation, a non-transitory computer-readable storage medium including program code stored thereon, the program code is operable to configure at least one processor in a location server in a wireless network for position determination of a user equipment (UE), the program code comprising instructions to: send positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receive a report of measurements of PRS signals from the UE, wherein at least one of the measurements of the PRS signals performed by the UE, the report of the measurements of the PRS signals, or a combination thereof are prioritized based at least on the prioritization of the PRS signals.

In one implementation, a method performed by a user equipment (UE) in a wireless network for position determination of the UE, includes receiving positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources based at least in part on an association with ROs; and performing PRS measurements of PRS signals is based on the determined at least one of positioning accuracy requirements, measurement accuracy, or a combination thereof.

In one implementation, a user equipment (UE) in a wireless network configured for position determination of the UE, includes a wireless transceiver configured to wirelessly communicate with entities in a wireless network; at least one memory; and at least one processor coupled to the wireless transceiver and the at least one memory and configured to: receive, via the wireless transceiver, positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources based at least in part on an association with ROs; and perform PRS measurements of PRS signals is based on the determined at least one of positioning accuracy requirements, measurement accuracy, or a combination thereof.

In one implementation, a user equipment (UE) in a wireless network configured for position determination of the UE, includes means for receiving positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources based at least in part on an association with ROs; and means for performing PRS measurements of PRS signals is based on the determined at least one of positioning accuracy requirements, measurement accuracy, or a combination thereof.

In one implementation, a non-transitory computer-readable storage medium including program code stored thereon, the program code is operable to configure at least one processor in a user equipment (UE) in a wireless network for position determination of the UE, the program code comprising instructions to: receive positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources based at least in part on an association with ROs; and perform PRS measurements of PRS signals is based on the determined at least one of positioning accuracy requirements, measurement accuracy, or a combination thereof.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
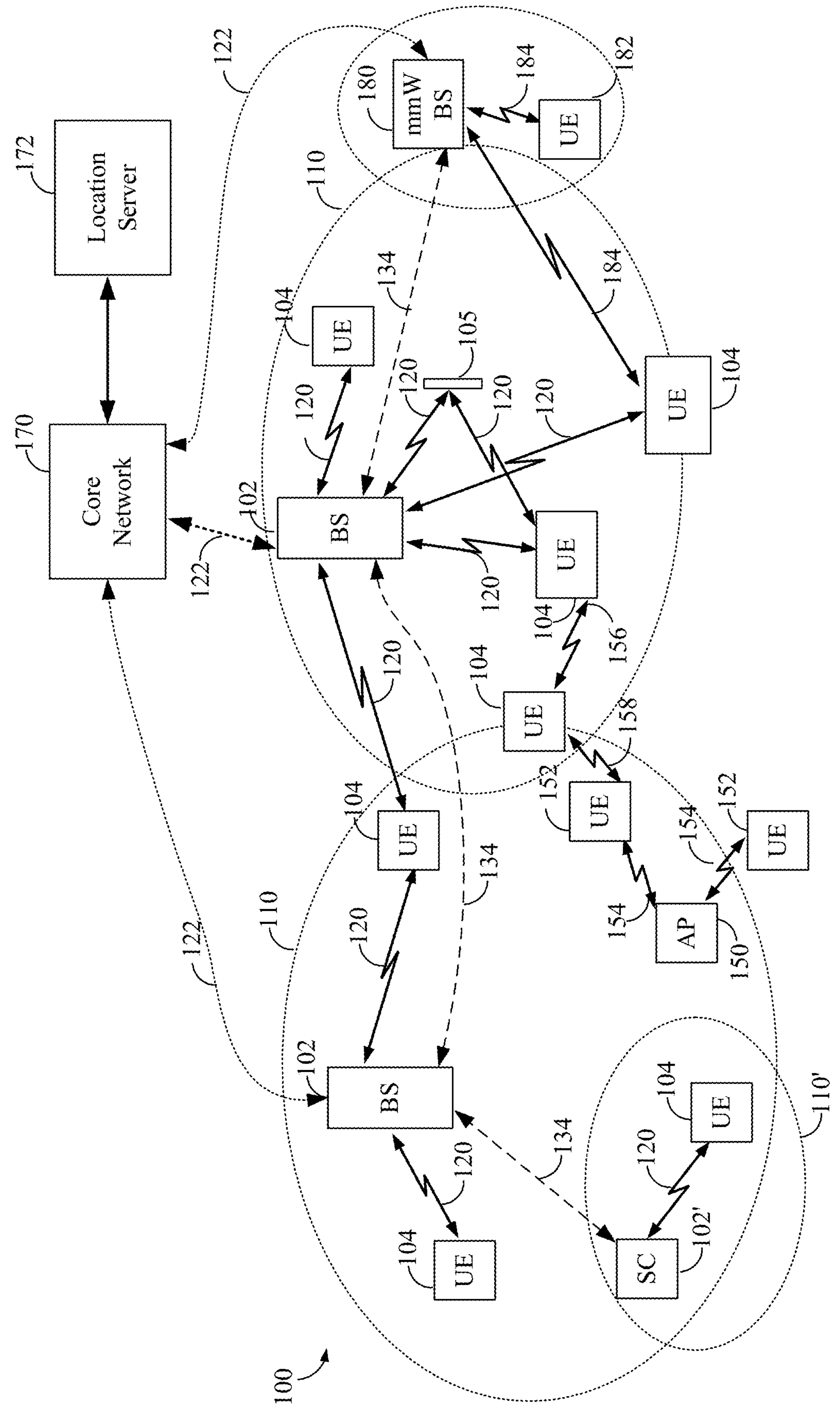
FIG. 1A illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "base station", and "transmission point (TRP)" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or transmission point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

FIG. 1A illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 or TRPs may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include one or more UEs 104 that connects indirectly to one or more communication networks via one or more device-to-device (D2D) peer-to-peer (P2P) links. In the example of FIG. 1A, a UE 104 may have a D2D P2P link 156 with one of the UEs 104 connected to one of the base stations 102 (e.g., through which the UE 104 may indirectly obtain cellular connectivity) and a D2D P2P link 158 with WLAN STA 152 connected to the WLAN AP 150 (through which the UE 104 may indirectly obtain WLAN-based Internet connectivity). In an example, the D2D P2P links 156 and 158 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 180 over a mmW communication link 184. For example, the macro cell base station 102 may support a PCell and one or more SCells for the UE 104 and the mmW base station 180 may support one or more SCells for the UE 104.

The wireless communications system 100 may further include one or more reflection objects (ROs) 105, that may reflect signals 120 received from a base station 104 towards a UE 104. The ROs may be static objects or may be active objects, such as a reconfigurable intelligent surface (RIS). A RIS, for example, may be a two-dimensional surface comprising a large number of low-cost, low-power near-passive reflecting elements whose properties are reconfigurable (by software) rather than static. For example, by carefully tuning the phase shifts of the reflecting elements (using software), the scattering, absorption, reflection, and diffraction properties of an RIS can be changed over time. In that way, the electromagnetic (EM) properties of an RIS can be engineered to collect wireless signals 120 from a transmitter (e.g., base station 102, a UE 104, etc.) and passively beamform them towards a target receiver (e.g., another base station 102, another UE 104, etc.). With the use of static or active ROs 105, an environment may be created where wireless signal propagation conditions are co-engineered with the physical layer signaling.

Figure 1B:
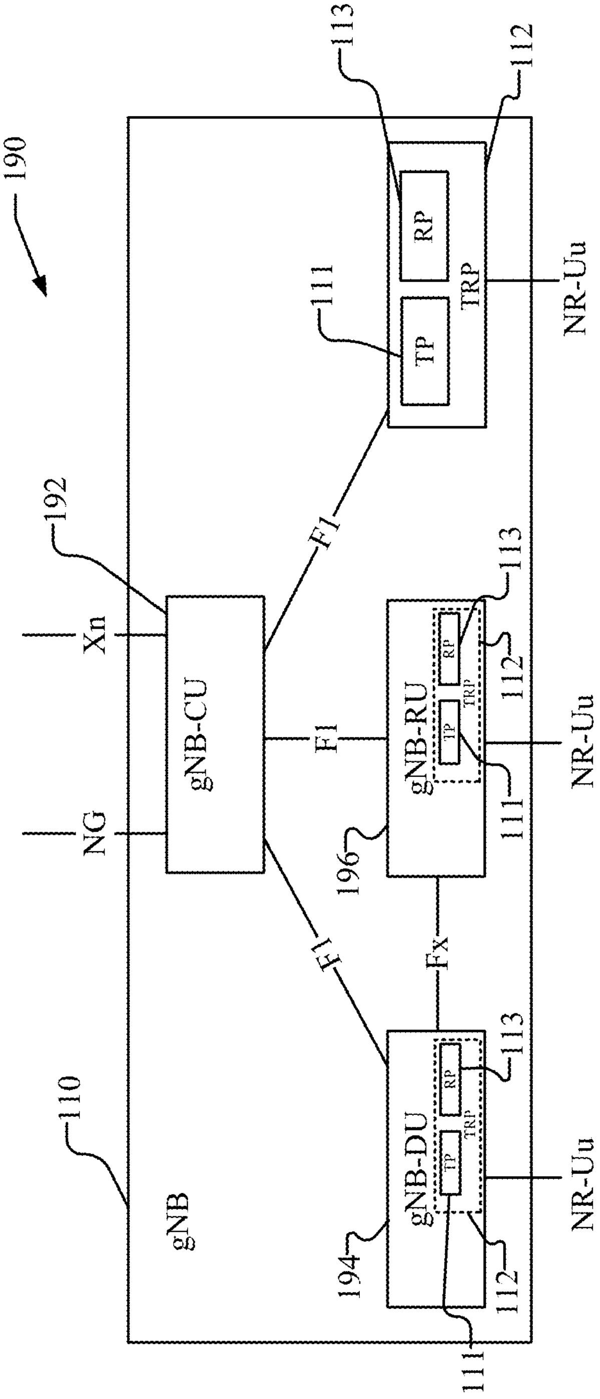
FIG. 1B shows an architecture diagram of an NG-RAN node that includes a gNB Central Unit, a gNB Distributed Unit, and gNB Remote Unit.

FIG. 1B shows an architecture diagram of an NG-RAN node 190 that may be within an NG-RAN in FIG. 1A, e.g., as a separate entity or as part of another gNB. The NG-RAN node 190 may be a gNB 102, according to one implementation. The architecture shown in FIG. 1B, for example, may be applicable to any gNB 102 in FIG. 1A.

As illustrated, gNB 102 may include a gNB Central Unit (gNB-CU) 192, a gNB Distributed Unit (gNB-DU) 194, a gNB Remote Unit (gNB-RU) 196, which may be physically co-located in the gNB 102 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 102 via an Xn interface. The gNB-DU 194 is a logical or physical node hosting support for Radio Link Control (RLC), Medium Access Control (MAC) and Physical (PHY) protocol layers used over the NR Uu air interface of the gNB 102, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 1B, gNB 102 may include a Transmission Point (TP) 111 and a Reception Point (RP) 113 combined into a Transmission Reception Point (TRP) 112, which may be physically or logically located in the gNB 102. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 102) may comprise a subset of the elements shown in FIG. 1B. For example, the NG-RAN node 190 may comprise the gNB-CU 192 but may not include one or more of gNB-DU 194 and gNB-RU 196, RP 113 or TP 111. Alternatively, NG-RAN node 190 may include one or more of gNB-DU 194 and, RP 113 or TP 111 but may not include gNB-RU 196. Further, the elements shown in FIG. 1B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 102, may use XnAP or a protocol above XnAP, such as an extended NR Positioning Protocol A (NRPPa) as defined in 3GPP TS 38.455. The location procedures between NG-RAN node 190 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 2A:
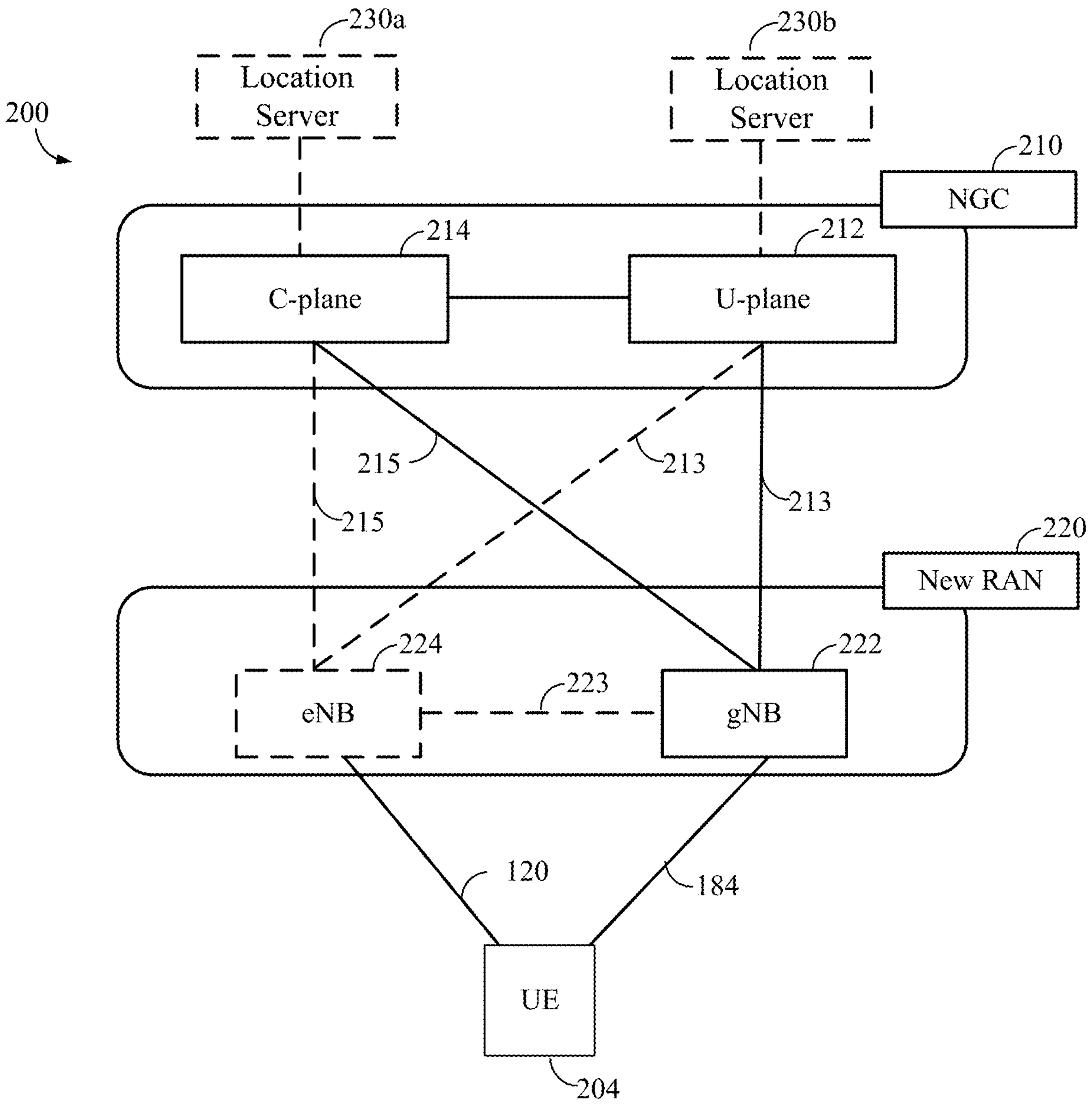
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230*a*, 230*b* (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
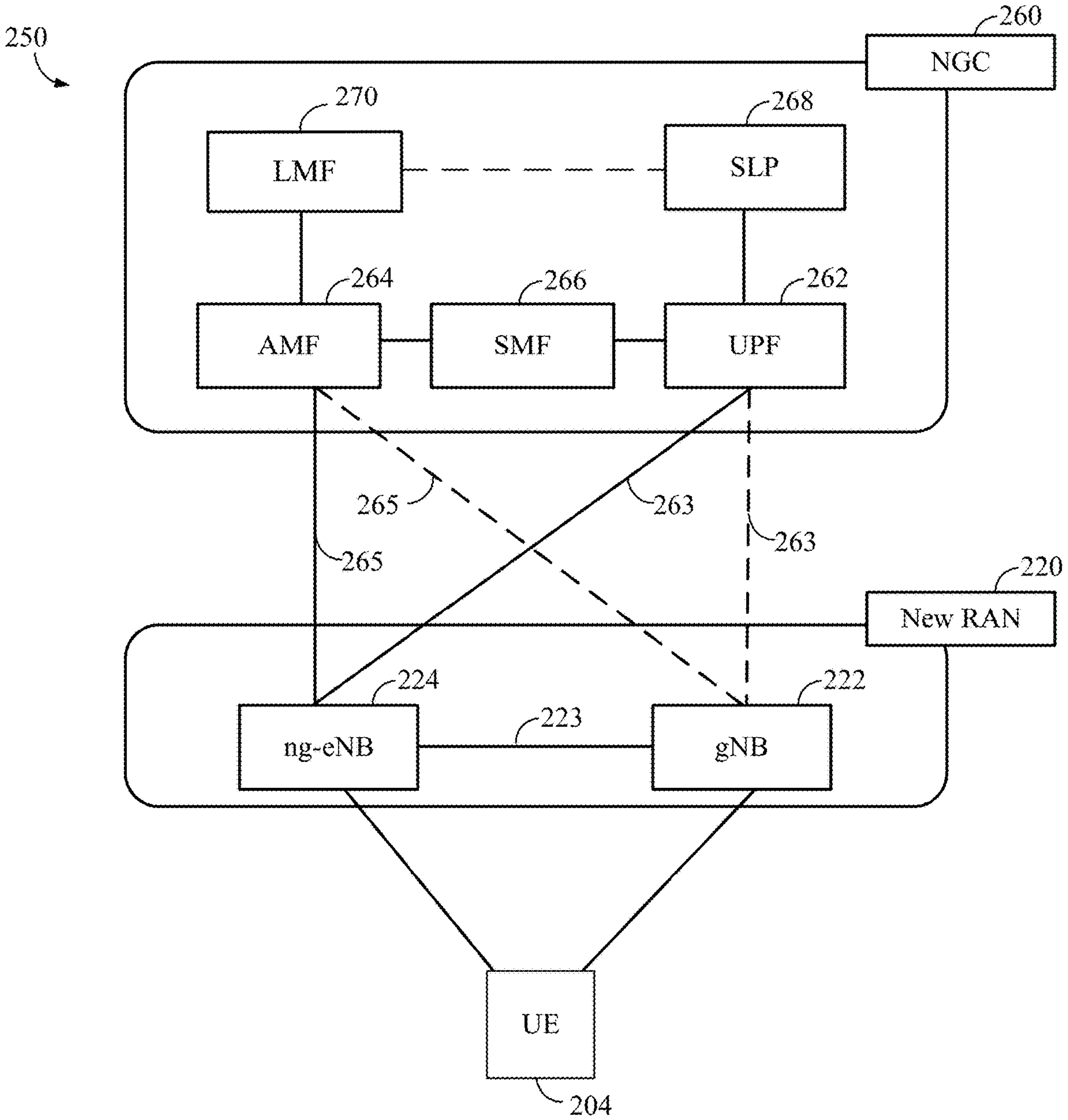

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1A). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
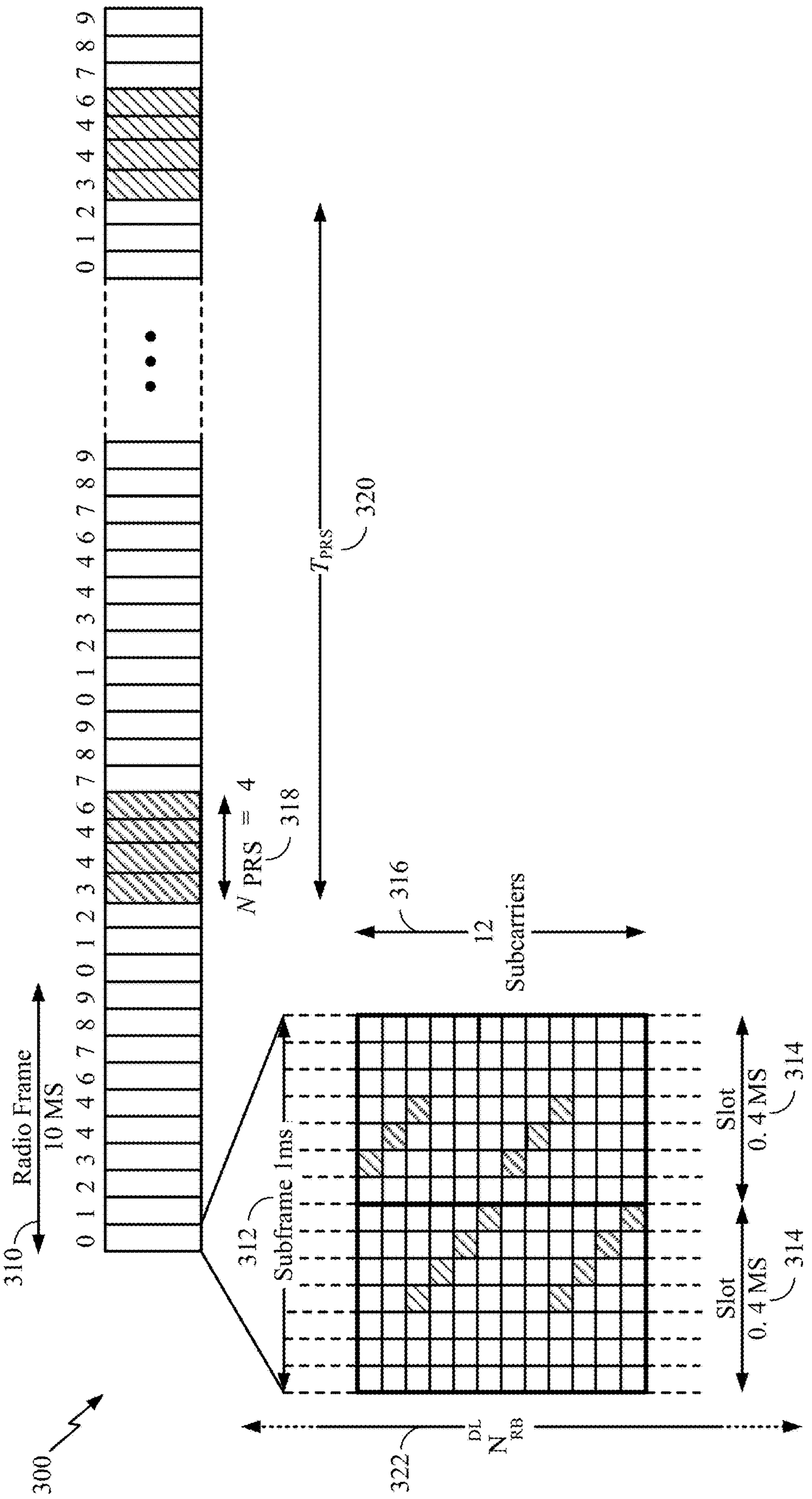
FIG. 3 illustrates a diagram of a structure of an exemplary subframe sequence with positioning reference signal (PRS) positioning occasions.

FIG. 3 shows a structure of an exemplary subframe sequence 300 with positioning reference signal (PRS) positioning occasions, according to aspects of the disclosure. Subframe sequence 300 may be applicable to the broadcast of PRS signals from a base station (e.g., any of the base stations described herein) or other network node.

The subframe sequence 300 may be used in LTE systems, and the same or similar subframe sequence may be used in other communication technologies/protocols, such as 5G and NR. In FIG. 3, time is represented horizontally (e.g., on the X axis) with time increasing from left to right, while frequency is represented vertically (e.g., on the Y axis) with frequency increasing (or decreasing) from bottom to top. As shown in FIG. 3, downlink and uplink radio frames 310 may be of 10 millisecond (ms) duration each. For downlink frequency division duplex (FDD) mode, radio frames 310 are organized, in the illustrated example, into ten subframes 312 of 1 ms duration each. Each subframe 312 comprises two slots 314, each of, for example, 0.5 ms duration.

In the frequency domain, the available bandwidth may be divided into uniformly spaced orthogonal subcarriers 316 (also referred to as "tones" or "bins"). For example, for a normal length cyclic prefix (CP) using, for example, 15 kHz spacing, subcarriers 316 may be grouped into a group of twelve (12) subcarriers. A resource of one OFDM symbol length in the time domain and one subcarrier in the frequency domain (represented as a block of subframe 312) is referred to as a resource element (RE). Each grouping of the 12 subcarriers 316 and the 14 OFDM symbols is termed a resource block (RB) and, in the example above, the number of subcarriers in the resource block may be written as $$N_{SC}^{RB} = 12.$$

For a given channel bandwidth, the number of available resource blocks on each channel 322, which is also called the transmission bandwidth configuration 322, is indicated as $$N_{RB}^{DL}.$$

For example, for a 3 MHz channel bandwidth in the above example, the number of available resource blocks on each channel 322 is given by $$N_{RB}^{DL} = 15.$$

Note that the frequency component of a resource block (e.g., the 12 subcarriers) is referred to as a physical resource block (PRB).

A base station may transmit radio frames (e.g., radio frames 310), or other physical layer signaling sequences, supporting PRS signals (i.e., a downlink (DL) PRS) according to frame configurations either similar to, or the same as that, shown in FIG. 3, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 3.

A collection of resource elements that are used for transmission of PRS signals is referred to as a "PRS resource." The collection of resource elements can span multiple PRBs in the frequency domain and N (e.g., 1 or more) consecutive symbol(s) within a slot 314 in the time domain. For example, the cross-hatched resource elements in the slots 314 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number NPRS of consecutive positioning subframes. The PRS positioning occasions for a cell supported by a base station may occur periodically at intervals, denoted by a number TPRS of milliseconds or subframes. As an example, FIG. 3 illustrates a periodicity of positioning occasions where NPRS equals 4 318 and TPRS is greater than or equal to 20 320. In some aspects, TPRS may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$)

or as a function of a physical cell identifier (PCI) (denoted as $N_{ID}^{cell}$)

if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes (NPRS) per positioning occasion and a particular periodicity (TPRS). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations and/or UL PRS transmitted to base stations, the UE may perform various RAT dependent positioning measurements. LTE systems, for example, use DL PRS for Observed Time Difference of Arrival (OTDOA) positioning measurements. NR systems, on the other hand, may use DL PRS for several different kinds of RAT dependent positioning measurements, such as time difference of arrival (TDOA), angle of departure (AoD), and may use DL PRS and UL PRS jointly to perform multi-cell positioning measurements, such as multi-cell Round Trip Time (M-RTT). Other types of RAT dependent positioning measurements that may be used for a position estimate for a UE include, e.g., time of arrival (TOA), reference signal time difference (RSTD), reference signal received power (RSRP), time difference between reception and transmission of signals (Rx-Tx), or angle of arrival (AoA). Other positioning methods exist, including methods that do not rely on PRS. For example, Enhanced Cell-ID (E-CID) is based on radio resource management (RRM) measurements.

With a UE assisted position method, UE 104 may obtain location measurements and send the measurements to a location server, e.g., location server 230*a*, 230*b*, or LMF 270) for computation of a location estimate for UE 104. For example, the location measurements may include one or more of a TDOA, AOD, M-RTT, etc. With a UE based position method, UE 104 may obtain location measurements (e.g., which may be the same as or similar to location measurements for a UE assisted position method) and may compute a location of UE 104 (e.g., with the help of assistance data received from a location server such as location server 230*a*, 230*b*, or LMF 270). With a network based position method, one or more base stations 102 or APs may obtain location measurements (e.g., measurements of UL-TDOA, Rx-Tx, for signals transmitted by UE 104, and/or may receive measurements obtained by UE 104, and may send the measurements to a location server for computation of a location estimate for UE 104. The base stations 102 may provide information to the location server that may include timing and configuration information for PRS transmission and location coordinates. The location server may provide some or all of this information to the UE 104 as positioning assistance data to aid in detection and measurement of PRS signals from one or more base stations. The assistance data may further include locations of the base stations, which may be used by the UE 104 to calculate a position estimate in a UE based positioning process.

Figure 4:
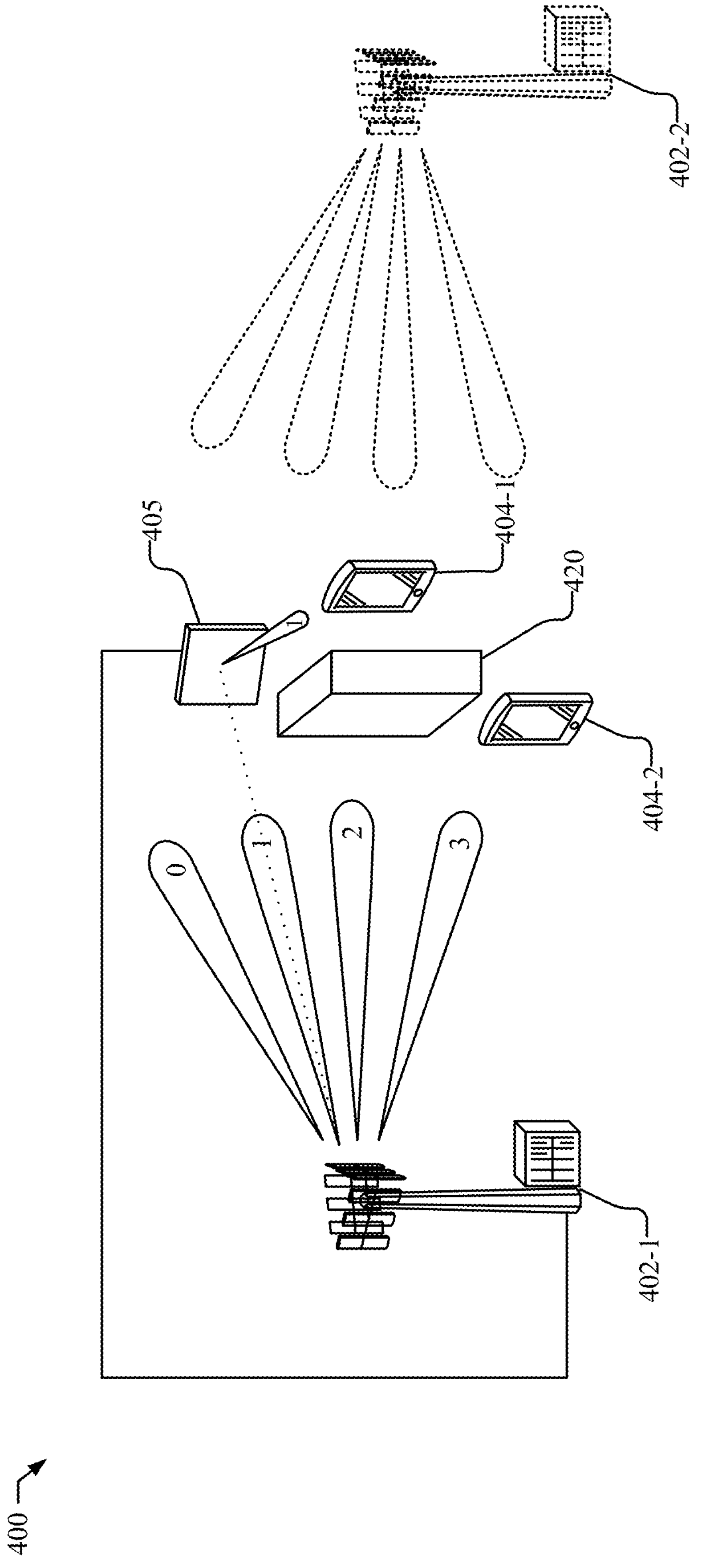
FIG. 4 illustrates an example system for positioning using a reflection object (RO).

FIG. 4 illustrates an example system 400 for positioning using a reflection object (RO) 405. The RO 405 may be a static RO or may be an active RO, such as a reconfigurable intelligent surface (RIS). As discussed above an RIS may be a two-dimensional surface comprising a large number of low-cost, low-power near-passive reflecting elements with reconfigurable properties. For example, by carefully tuning the phase shifts of the reflecting elements (using software), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). In the example of FIG. 4, a first base station 402-1 controls the reflective properties of RO 405 in order to direct one or more signals towards a first UE 404-1. The use of RO 405 is advantageous as it may enhance functionality of the system 400.

By way of example, in one scenario, as shown in FIG. 4, the first base station 402-1 (e.g., any of the base station described herein) may attempt to transmit downlink wireless signals to the first UE 404-1 and a second UE 404-2 (e.g., any two of the UEs described herein, collectively, UEs 404) on a plurality of downlink transmit beams, labeled "0," "1," "2," and "3." However, unlike the second UE 404-2, the first UE 404-1 does not receive a wireless signal on what would otherwise be the line-of-sight (LOS) beam from the first base station 402-1 (e.g., beam labeled "2"), because the first UE 404-1 is behind an obstacle 420 (e.g., a building, a hill, or another type of obstacle). In some implementations, the first UE 404-1 and the second UE 404-2 may be in SL communication, or may be transmitting SL PRS for positioning.

In this scenario, the first base station 402-1 may instead use the downlink transmit beam labeled "1" to transmit the wireless signal to the RO 405, and the RO 405 may be configured (e.g., statically, or actively by the first base station 402-1) to reflect/beamform the incoming wireless signal towards the first UE 404-1. For example, if the RO 405 is a static, the RO 405 may reflect transmit beam 1 as the beam labeled 1*c*. If the RO 405 is actively controlled, the RO 405 may be configured to reflect or beamform the transmit beam 1 from base station 402-1 as beams 1*a*, 1*b*, 1*c*, and 1*d*. The first base station 402-1 can thereby transmit the wireless signal labeled beam 1 around the obstacle 420.

Note that the RO 405 may also be configured (e.g., statically or actively by the first base station 402-1) for the first UE's 404-1 use in the uplink. In that case, the RO 405 may reflect an uplink signal from the first UE 404-1 to the first base station 402-1, thereby enabling the first UE 404-1 to transmit the uplink signal around the obstacle 420.

In another example, the first base station 402-1 may be aware that the obstacle 420 may create a "dead zone," that is, a geographic area in which the downlink wireless signals from the first base station 402-1 are too attenuated to be reliably detected by a UE within that area (e.g., the first UE 404-1). In this scenario, the first base station 402-1 may use the RO 405 (statically or actively) to reflect downlink wireless signals into the dead zone in order to provide coverage to UEs that may be located there, including UEs about which the first base station 402-1 is not aware.

An RIS (e.g., RO 405) may be designed to operate in either a first mode (referred to as "Mode 1"), in which the RIS operates as a reconfigurable mirror, or a second mode (referred to as "Mode 2"), in which the RIS operates as a receiver and transmitter (similar to the amplify and forward functionality of a relay). Some RIS may be designed to be able to operate in either Mode 1 or Mode 2, while other RIS may be designed to only operate in Mode 1. Mode 1 RIS are assumed to have a negligible hardware group delay, whereas Mode 2 RIS have a non-negligible hardware group delay. This is because Mode 2-capable RIS are equipped with baseband processing capability in order to forward (and amplify if needed) a received signal. In an aspect, the first base station 402-1 may indicate whether the RO 405 is a Mode 1 RIS or a Mode 2 RIS. In the latter case, the first base station 402-1 may compute and provide an associated reception-to-transmission (Rx-Tx) time difference for the RO 405. In some designs, the RO 405 may compute and/or report its Rx-Tx time difference, and the first base station 402-1 may report this capability.

FIG. 4 also illustrates a second base station 402-2 that may transmit downlink wireless signals to one or both of the UEs 404. As an example, the first base station 402-1 may be a serving base station for the UEs 404 and the second base station 402-2 may be a neighboring base station. The second base station 402-2 may transmit downlink positioning reference signals to one or both of the UEs 404 as part of a positioning procedure involving the UE(s) 404. Alternatively or additionally, the second base station 402-2 may be a secondary cell for one or both of the UEs 404. In some cases, the second base station 402-2 may also be able to use the RO 405 to direct signals between the second base station 402-2 and the UE 404-1.

The use of ROs in positioning may be advantageous as it enables positioning with a reduced number of base stations. For example, a single base station may be used for positioning using an LOS downlink reference signal, and two ROs with known positions that can reflect downlink reference signals from the base station to the UE. The use of ROs provides an increased number of available anchors for improved triangulation or trilateration. Further the use of ROs may mitigate the effect of "positioning holes," e.g., areas or dead zones in which downlink wireless signals from base stations are not suitable for positioning due to blockage conditions. For example, a UE may be under adequate cell coverage, without the need of ROs, for positioning at some locations and/or times, but due to blockage conditions, LOS cell coverage may be inadequate at other locations and/or times, but coverage from ROs may be used for positioning. Further, ROs may provide angle-based method enhancements due to the use of narrow beams received from reflections from ROs.

With the use of ROs for positioning and different coverage areas and transmit (Tx) beams of the reference signal transmitted by a TRP, e.g., base station 402-1, that are received by a UE without RO reflection (e.g., beam 3 received by UE 404-2) and with RO reflection (e.g., beam 1 received by UE 404-1), two types of PRS may be identified. For example, a first type of positioning reference signal (Type 1 PRS), may be a conventional DL PRS transmitted from a base station to UE without RO reflection. The beams of type 1 PRS, for example, may cover a relatively wide area. For example, as illustrated by beams 0, 2, and 3 from base station 402-1 in FIG. 4, type 1 PRS may not be detected/received by a UE that is in a dead zone due to blockage conditions. A second type of positioning reference signals (Type 2 PRS), may be the PRS that is transmitted from a base station to an RO, then reflected by the RO. The beams of type 2 PRS may cover a relatively narrower area. For example, as illustrated by beam 1 from base station 402-1 and reflected beams 1*a*, 1*b*, 1*c*, and 1*d* from RO 405 in FIG. 4, type 2 PRS may cover an area that is blocked from type 1 PRS. The UE under the cell coverage (for example, the UE 404-2 in FIG. 4) may not be able to measure the type 2 PRS beams from the RO 405.

The type 1 PRS is only associated with the TRP, e.g., base station 402-1, as there is no reflection from an RO. Type 2 PRS, on the other hand, is not only associated with the TRP, e.g., base station 402-1, but is also associated with a specific RO, e.g., RO 405. Accordingly, the type 2 PRS configuration received by the UE 404-1 in assistance data should include the TRP ID and the RO ID. The type 2 PRS may be descrambled using the TRP ID and RO ID. For each base station, there may be multiple associated ROs, which may introduce the concept of a serving RO and neighboring RO, in an analogous manner as serving base station and neighboring base station for TDOA type measurements. Given the lower power of type 2 PRS (ROs are near passive devices), type 2 PRS may be configured with larger "PRS-ResourceRepetitionFactor" than the used with type 1 PRS. Further to enhance measurement accuracy, type 1 PRS and type 2 PRS may be transmitted with different carrier frequency and/or bandwidth and/or with different times.

With the use of ROs, assistance data provided to a UE for positioning needs to be enhanced to account for ROs. For example, an association of a PRS resource with multiple antenna point locations may be used. The assistance data framework may be general enough to enable associating a PRS resource with a controllable or non-controllable reflection directions. For example, the direction of a beam from an active RO (such as an RIS) may be controlled by the network or not. In another example, a reflection from a static object may be identified in the environment, which cannot be controlled by the network. The assistance data framework may also be general enough to enable associating a PRS resource with a RO with known or unknown location. For example, a reflection may be from a RO with unknown location, or another mappable reflection that has been identified in the environment, whose location is not known.

The assistance data may include a separate list of ROs, sometimes referred to as Reflection Point Objects (RPO), with each RPO associated with an RPO-ID and a Point Location. The list may enable one-to-many or many-to-one association between PRS and RPOs. Table 1, for example, provides an example of RPO information, and Table 2 provides an example of PRS resource information.

TABLE 1

| |
|---|
| RPO-Info: |
| RPO1:{Location1,ID=0} |
| RPO2:{Location2,ID=1} |

TABLE 2

| |
|---|
| PRS resource 1 - Location |
| ARP-Location = TRP Location (Rel-16) |
| ARP-Location-Reflection1 = RPO1 |
| ARP-Location-Reflection2 = RPO2 |

After receiving the assistance data for the two types of PRS, type 1 PRS and type 2 PRS, the UE may be expected to measure both types of PRS. However, the two types of PRS may not always have equal utility for positioning and, accordingly, may not deserve equal priority. The measurement of the type 1 PRS, for example, should be given higher priority than type 2 PRS under certain circumstances. For example, if the UE has good cell coverage, e.g., there are no blockage conditions, the UE may not need to measure the type 2 PRS reflected by the RO. The beams for type 2 PRS may be optimized for PRS reception in areas with dead zones, and accordingly it is likely that the type 2 PRS measurement quality will be poor when type 1 PRS measurement quality is high. Thus, when the UE has good cell coverage, type 1 PRS may be given priority over type 2 PRS, which may improve positioning accuracy, and may also save UE power by reducing the number of PRS measurements. When the UE has poor cell coverage, however, the UE may not be able to measure the type 1 PRS with high quality. Accordingly, in such conditions, the UE may continue the search of type 2 PRS, which may provide better PRS measurement quality.

Similarly, for measurement reporting by the UE, prioritization of one type of PRS over the other may likewise be advantageous. For example, to reduce the latency for positioning, the UE may first report the PRS measurement with higher quality. Considering the limited payload for physical uplink shared channel (PUSCH) and physical uplink control channel (PUCCH), the UE may report measurement with higher quality to enable low latency positioning. To reduce the latency and save UE power, the UE may avoid reporting one type of PRS for specific base stations, e.g., avoid reporting type 2 PRS measurements for a specific TRP, and may indicate this behavior in the measurement report. With this indication, the location server would not wait for the remaining measurements for its UE position calculation.

Figure 5:
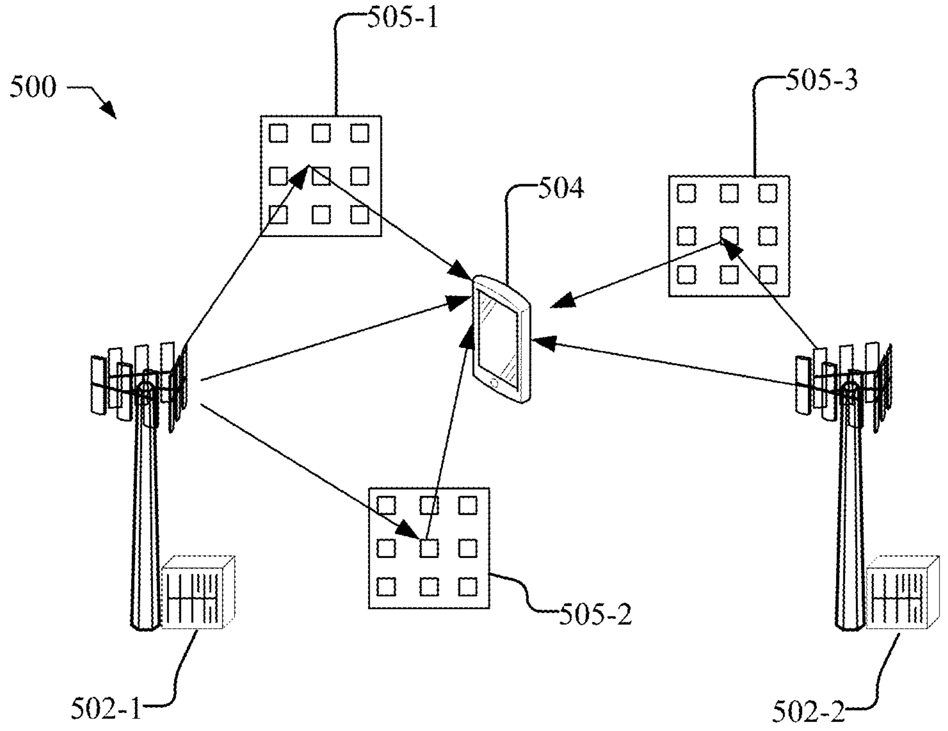
FIG. 5 illustrates a system for positioning a UE in which PRS measurement and/or reporting are prioritized based on associated ROs.

FIG. 5 illustrates, by way of example, a system 500 for positioning a UE 504 in which PRS measurement and/or reporting are prioritized based on associated ROs. As illustrated, a first base station 502-1 transmits a number of PRS resources, illustrated as PRS1, PRS2 and PRS3, where PRS2 is LOS and received directly by the UE 504. The PRS1 is reflected by a first RO 505-1, which is turned ON to actively control the direction of the reflected beam towards UE 504. The PRS3 is reflected by a second RO 505-2, which does not control the direction of the reflected beam towards UE 504. For example, the third RO 505-3 may be turned OFF, may be turned ON but not being controlled to direct beams toward UE 504, or may be a static RO. Additionally, a second base station 502-2 may also transmit a number of PRS resources, illustrated as PRS4 and PRS 5, where PRS5 is LOS and received directly by the UE 504. The PRS4 from the second base station 502-2 is reflected by a third RO 505-3 which may be ON so that controls the direction of the reflected beam towards UE 504.

In the present example, the location of each of the ROs 505-1, 505-2, and 505-3 may be known, and thus, may be used for positioning the UE 504. Thus, while the PRS signals PRS1, PRS2, PRS3 from base station 502-1 and PRS4 and PRS5 from base station 502-2 may be suitable for positioning, the PRS signals may be prioritized based on information about the PRS resources, PRS resource sets, TRPS, or any combination thereof. The prioritization of the PRS signals may be for measurement and/or reporting.

By way of example, PRS2 and PRS5 may be prioritized over PRS1, PRS3, and PRS4 as being LOS PRS with no blockage conditions. Moreover, PRS1 and PRS4 may be prioritized over PRS3 as the ROs 505-1 and 505-3 are actively directing the PRS signals PR1 and PR4, respectively, towards the UE 504, while RO 505-2 is not controlling the direction of the reflection of the PRS3. If a PRS resource set is directly associated with an RO (or if all the PRS resources of the PRS resource set are associated with an RO), then that PRS resource set may have a higher priority than a PRS resource set that is not associated with an RO (or if at least one of the PRS resources of the PRS resource set is not associated with an RO). Moreover, base station 502-1 may be prioritized over base station 502-2 as there are three PRS signals (PRS1, PRS2, and PRS3) available from base station 502-1, while there are only two PRS signals (PRS4 and PRS5) available from base station 502-2.

A UE may be configured with frequency layers, TRPs, PRS resource sets, and PRS resources, e.g., as known in the art and describe in 3GPP Technical Specification (TS) 38.214. For example, the frequency layer consists of one or more PRS resource sets and may be defined by one or more of the subcarrier spacing for the DL PRS resource, the cyclic prefix for the DL PRS resource, and the absolute frequency of the reference resource block. The UE may be configured with IDs defined such that it is associated with multiple DL PRS Resource Sets from the same cell (TRP). The PRS resource set consists of one or more DL PRS resources and may be defined by one or more of the identity of the DL PRS resource set configuration, the DL PRS resource periodicity, how many times each DL-PRS resource is repeated for a single instance of the DL-PRS resource set, the offset in number of slots between two repeated instances of a DL PRS resource with the same DL-PRS-ResourceID within a single instance of the DL PRS resource set, a muting pattern defined by a bitmap of the time locations where the DL PRS resource is expected to not be transmitted for a DL PRS resource set, the time offset of the SFN0 slot 0 for the transmitting cell, the slot offset with respect to SFN0 slot 0, the comb size of a DL PRS resource, the resource bandwidth defined by the number of resource blocks configured for PRS transmission, and the starting PRB index of the DL PRS resource with respect to reference Point A. The PRS resource may be defined by one or more of the resource lists that determine the DL PRS resources that are contained within one DL PRS resource set, the DL PRS resource configuration identity, the sequence ID used to initialize the pseudo random generator for generation of DL PRS sequence for a given DL PRS resource, the starting resource element (RE) offset of the first symbol within a DL PRS resource in frequency, the starting slot of the DL PRS resource, the starting symbol of the DL PRS resource within the starting slot, the number of symbols of the DL PRS resource within a slot, any quasi-colocation information of the DL PRS resource with other reference signals.

Currently, a UE may be configured to prioritize DL PRS resources and DL PRS resource sets received directly from base stations may be prioritized. For example, 3GPP TS 38.214, states "Within a positioning frequency layer, the DL PRS resources are sorted in the decreasing order of priority for measurement to be performed by the UE, with the reference indicated by nr-DL-PRS-ReferenceInfo being the highest priority for measurement, and the following priority is assumed: Up to 64 dl-PRS-IDs of the frequency layer are sorted according to priority; Up to 2 DL PRS resource sets per dl-PRS-ID of the frequency layer are sorted according to priority."

When a RO, such as RO 405 shown in FIG. 4, is deployed to assist with communication, the RO may be used to "control" the propagation environment, e.g., if the RO is a RIS that is turned ON and used to direct beams towards the UE 404-1. The reflection matrix for the RO, for example, may be dynamically changed. For a SL UE, however, the reflection of signals by the RO may create difficulties. For example, the sensing results may be unreliable since the channel strength on a link may be greatly impacted by the ON/OFF status of a RO. Further, if two UEs are communicating, their channel quality may experience significant changes over time, making channel state information (CSI) feedback (and power control) less useful. Consequently, in the case of using ROs in positioning, the positioning accuracy may be a function of presence of ROs or not, as well as the status of the ROs, e.g., ON or OFF.

The accuracy of positioning when a RO is ON is expected to be different from that when the RO is OFF. Moreover, in some cases, the RO may be the only way to communicate between two entities in the network, e.g., base station to UE, UE to base station, UE to UE, etc., and accordingly communication may be available only when the RO is ON. If the Uu communication has no direct link without an RO, then in Uu interface the RO should be ON to enable the positioning process. Further, if a SL communication has no direct link without an RO, then in SL, the RO may be ON or OFF, but for positioning the RO will be ON or OFF based on how the UEs and/or base stations want to manage the accuracy of positioning. For example, for UEs or devices that are not being helped with ROs at the current time, the transmissions from ROs may be seen as interference. Hence, it may be appropriate to disable positioning using transmissions from ROs for those UEs or at least know that accuracy is lower than usual and should be taken into account when determining a position estimate for the UE. Thus, in general, the accuracy of positioning may depend on 1) RO state (ON/OFF); 2) If RO is ON, whether RO is helping the UE or helping other UEs (thus RO is acting as interferer).

Thus, PRS resource measurement and processing for positioning should consider the RO status and association to the PRS resources. In addition, even if an RO is ON and associated with a PRS resource, that does not mean that the RO is reflecting a signal in a way that is helpful or designed for the UE. Positioning accuracy and reporting of PRS resource measurements should likewise consider information related to associated ROs.

Accordingly, as discussed herein, the priority of processing and measurement for PRS resource, PRS resource set, TRP, or a combination thereof, and/or the priority of reporting measurements may be based on the RO status. For example, there are two cases when one or more ROs are ON and associated with a PRS resource, PRS resource set, or TRP. In one case (CASE1), the RO is ON and its reflection properties (e.g., AoA, AoD, Tx power, Tx beam information) are designed to assist in location of the UE. In one example, the UE is capable of performing advance PRS processing in order to exploit the RO reflection within the PRS resource. In another example, the UE is not capable of performing advance PRS processing in order to exploit the RO reflection within the PRS resource. Thus, the UE capability may be relevant to prioritization based on the RO status. In another case (CASE2), the RO is ON and its reflection properties (e.g., AoA, AoD, Tx power, Tx beam information) are not designed to assist in location of the UE. In a third case, the PRS may legacy PRS resources without a RO associated with it, or with the status of the RO OFF.

If the RO associated with a PRS resource, PRS resource set, TRP, or combination thereof, is reflecting the PRS signal(s) for the purpose of enhancing the positioning performance of a UE, the UE may prioritize the PRS signals over other resources. The UE may determine whether a RO is reflecting signals to enhance its positioning measurements in a variety of ways. For example, in one option, the UE may be configured with a pathloss reference signal that includes the RO that is to be included in the determination of the pathloss measurement. In another option, the UE may be configured with a spatial Rx reference signal, a Quasi Colocation (QCL) reference signal, or a combination thereof, that includes the RO to be included in the determination of the Rx beam or QCL, or combination thereof. In another option, the RO may have an AoD that is pointing towards the expected AoD of the UE. For example, the UE may receive assistance data that contains, for each PRS resource, the boresight direction or other beam information for the transmitting TRP, but also for the RO. The UE may know its approximate location with which it can determine or may receive additional assistance data providing where the expected AoD is with regards to known geographic points. The UE may compare whether a specific AoD of a reflection of a RO is pointing in the direction of the UE. In another option, the UE may receive an explicit request by a network entity to measure multipath components of a PRS resource that has the RO associated with it and the RO is active. In another option, the expected RSTD uncertainty window for measuring multipath components of a PRS resource that has this RO associated with may be below a threshold and the RO may be active. In another option, the UE may be able to perform advanced processing (e.g., multipath detection and reporting), otherwise, it should prioritize the PRS that have less multipath. Additional or alternative or any combination of options may be used for determining whether a RO is reflecting signals to enhance a UE positioning measurements.

If a PRS resource, PRS resource set, or TRP is associated with a higher number of ROs than another PRS resource, PRS resource set, or TRP, the PRS resource, PRS resource set, or TRP with the higher number of ROs may be prioritized for the purpose of measurement and reporting. For example, by focusing on PRS resources that have a greater number of ROs associated with it, lower latency and lower power consumption may be achieved.

In addition, when an RO is ON and associated with a PRS resource, the technique and accuracy for positioning are different in general, depending for example on the UE's capability of processing, multipath differentiation and multipath interference suppression. Positioning accuracy requirements or measurement accuracy may be different for UEs not supporting PRS resources with an RO is ON. A UE may be configured so that AoA, AoD, RSRP, or RSTD accuracy measurements do not apply when the RO is ON. In another option, the UE may be configured so that AoA, AoD, RSRSP, or RSTD accuracy requirements during RO activity are different (and have separate tables/accuracy) for RO is ON under CASE 1 and CASE 2 and under CASE 3 with the RO OFF, discussed above.

Additionally, in some positioning measurements, such as DL-AoD, the UE reports path-RSRP of the earliest path. There may be a priority of which PRS resources should be measured first, based on a static prioritization, or there may be subsets of PRS resources that are associated with each PRS resource, and if a UE is expected to report a specific PRS resource, it should also report the associated PRS subset. Similarly, there may be one or multiple ROs associated with a specific PRS resource, and there may be priority amongst the plurality of the path-RSRP that the UE would measure. For example, assume a PRS resource is associated with 4 ROs, and environment conditions have no other multipath components. The UE then could measure and report up to 5 path-RSRPs (the LOS and the 4 ROs). However, the location server may be aware that only a subset of the ROs are really designed to help with the UE, so the UE should prioritize that subset of ROs.

Figure 6:
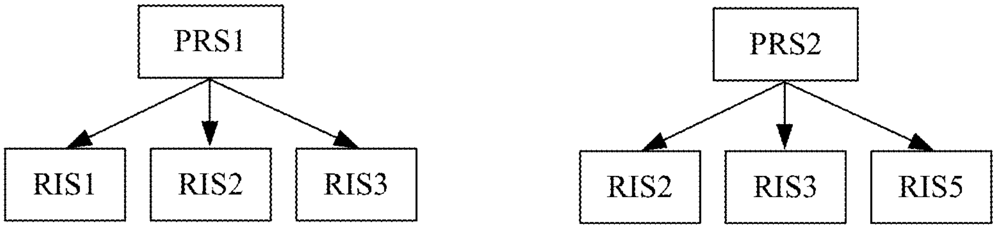
FIG. 6 illustrates the association of ROs with different PRS and determining priority of PRS based on the priorities of the associated ROs.

FIG. 6, by way of example, illustrates the association of ROs with different PRS and determining priority of PRS based on the priorities of the associated ROs. As illustrated, PRS1 is associated with RO1, RO2, and RO3, while PRS2 is associated with RO2, RO3, and RO5. For PRS1, the priority of the ROs may be provided as RO1 has priority over RO2, which has priority over RO3. For PRS2, the priority of the ROs may be provided as RO2 has priority over RO3, which has priority over RO5. For example, RO5 the reflection matrix of RO5 may not be configured to assist positioning of the UE. Thus, PRS1 is associated with three ROs having higher priority than the three ROs associated with PRS2. Accordingly, it may be desirable to prioritize PRS1 over PRS2 based on the priorities of the ROs.

Additionally, there may be a global prioritization of ROs configured to the UE, which may be used to determine which PRS resources should be prioritized. For example, in an environment there may be 2 ROs, and the location server may configure the UE so that that RO1 is higher priority than RO2. Moreover, RO1 may be associated with a number of PRS, e.g., PRS1, PRS2, and PRS5, and RO2 may be associated with a number of PRS, e.g., PRS3, PRS7, and PRS8. The PRS1, PRS2, and PRS5 may inherit the higher priority of RO1 and should be prioritized over the PRS3, PRS7, and PRS8 for processing and measurement and/or reporting of the measurements. The RO prioritization may be determined implicitly by the ordering of the RO in a database or in received assistance data, or can be explicitly configured by the location server, and may be dynamically changed or semi-static. The prioritization of the ROs may be included in the unicast, or broadcast assistance data. Further the prioritization may differ for different positioning methods and/or positioning modes.

Figure 7:
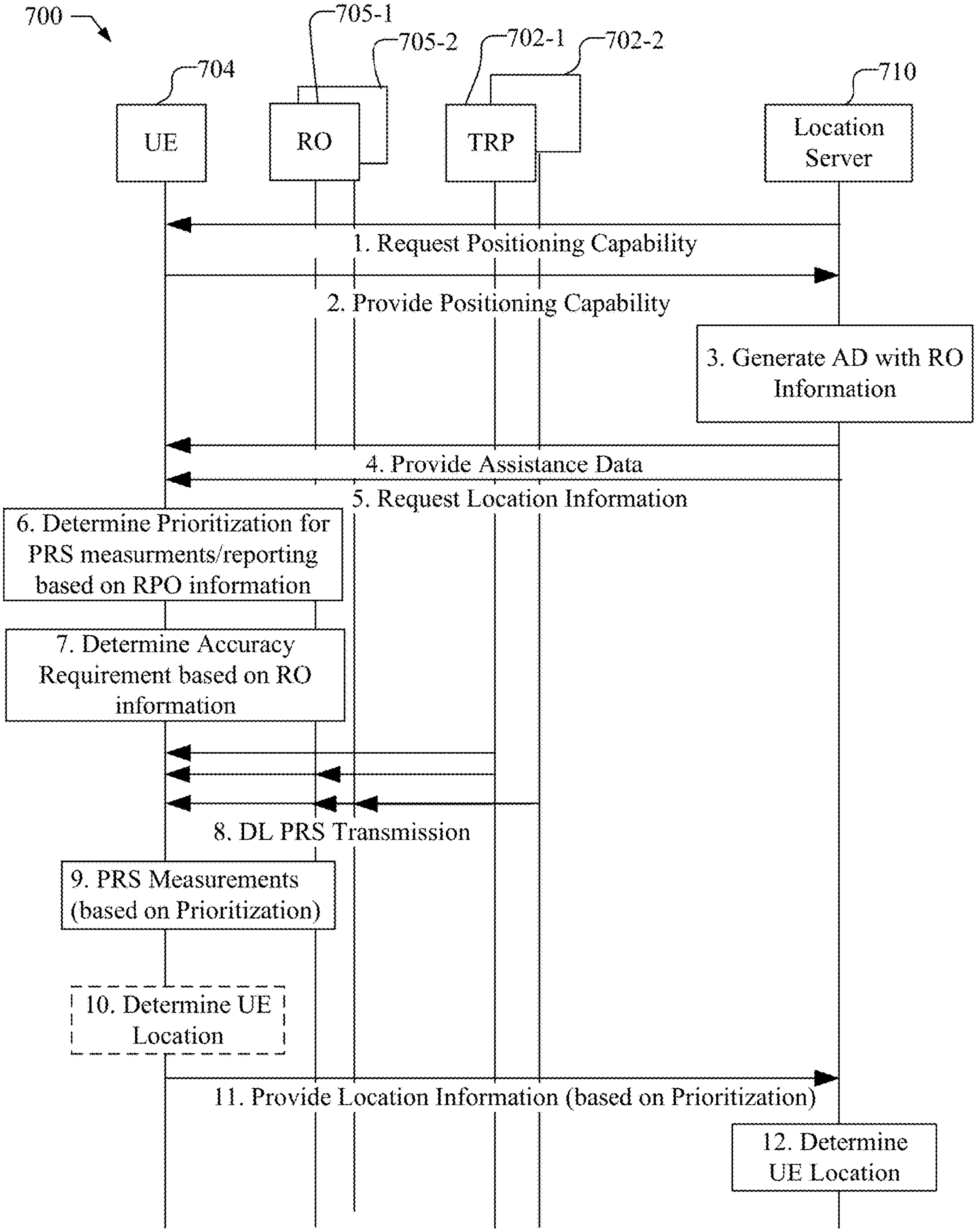
FIG. 7 illustrates a signaling flow in a positioning session that includes prioritization of PRS measurement and/or reporting based on information related to associated ROs.

FIG. 7 shows a signaling flow 700 that illustrates various messages that may be sent between components of a wireless communication system, such as wireless communication system 100 depicted in FIG. 1A, in a positioning session that includes prioritization of PRS measurement and/or reporting based on information related to associated ROs, as discussed herein. Flow diagram 700 illustrates UE 704, two TRPs 702-1, and 702-2, which may be collective referred to as TRPs 702, two ROs 705-1 and 705-2, which may be collectively referred to as ROs 705, which may be controllable or non-controllable and in some implementations may be RIS, and a location server 710. The UE 704, for example, may be UE 104, 404, 504, the TRPs 702 may be a base station 102, 402, 502, ROs 705 may be ROs 105, 405, 505, and location server 710 may be location server 172, 230*a*, 230*b*, or LMF 270. It should be understood that while a single location server 710 is illustrated in FIG. 7, multiple location servers or other entities may be used for different stages of FIG. 7. While the flow diagram 700 is discussed, for case of illustration, in relation to a 5G NR wireless access, signaling flows similar to FIG. 7 involving other types of high frequency networks and base stations will be readily apparent to those with ordinary skill in the art. In some embodiments, the UE 704 may be configured for UE based position determination or UE assisted positioning determination. FIG. 7 illustrates implementations for several different positioning methods that may be used separately or combined. For example, one or more of DL positioning methods TDOA and AoD may be performed, or combined UL and DL positioning methods, such as M-RTT may be performed. In the signaling flow 700, it is assumed that the UE 704 and location server 710 communicate using the LPP positioning protocol, although use of NPP or a combination of LPP and NPP or other future protocol, such as NRPPa, is also possible. Further, it should be understood that all messages illustrated in FIG. 7 may not be transmitted, and further, that FIG. 7 may not show all messages transmitted between entities in a positioning session.

At stage 1, the location server 710 sends a Request Positioning Capability message to the UE 704, e.g., to request the positioning capabilities from the UE 704.

At stage 2, the UE 704 returns a Provide Positioning Capabilities message to the location server 710 to provide the positioning capabilities of the UE 704. The UE 704, for example, may indicate its capabilities to perform different positioning measurements, as well as its capabilities with respect to its ability to perform advanced processing, such as multipath detection and reporting, its ability to use PRS reflected from an RO, its ability to perform multipath differentiation and multipath interference suppression, etc.

At stage 3, the location server 710 may generate positioning assistance data for the UE 704 based, e.g., at least partially on the positioning capabilities of the UE 704. For example, as discussed above, the positioning assistance data may include one or PRS resources, one or more PRS resource sets, and one or more TRPs. The positioning assistance data may further include information for one or more ROs 705 associated with one or more of the PRS resources, PRS resource sets, TRPs, or a combination thereof. In some implementations, the positioning assistance data may include a prioritization of PRS signals for at least one of measurement, reporting, or a combination thereof, based at least on the information for the one or more ROs. The information for the one or more ROs may include the status of ROs, e.g., whether the ROs 705 are ON or OFF, their locations, the identities of the PRS resources, PRS resource sets, TRPs, or a combination thereof associated with the ROs, reflection properties of the ROs, such as AoA, AoD, Tx power, Tx beam information, e.g., beam width, boresight, or a combination thereof. In some implementations, multiple ROs may be associated with at least one PRS resource, PRS resource set, TRP, or a combination thereof. The information for the ROs may further include the prioritization of the ROs.

At stage 4, the location server 710 may send a Provide Assistance Data message to the UE 704 to provide the positioning assistance data to assist the UE 704 to acquire and measure the PRS signals and optionally determine a location from the PRS measurements.

At stage 5, the location server 710 may send a Request Location Information message to the UE 704 to request the UE 704 to measure DL PRS transmission by the TRPs 702, e.g., for DL positioning methods, such as TDOA, or AoD, and in some cases to transmit UL PRS, e.g., SRS, for measurement by the TRPs in a combined DL and UL positioning method, such as M-RTT. The location server 710 may also indicate whether UE based positioning is requested whereby the UE 704 determines its own location, or UE assisted positioning.

At stage 6, the UE 704 may determine the prioritization for PRS signals for measurement and/or reporting. The UE 704, for example, may determine the prioritization based on a prioritization provided in the positioning assistance data or may determine the prioritization based on the information for the one or more ROs provide in the positioning assistance data. For example, as discussed above, the prioritization for measurement and/or reporting determined by the UE 704 in stage 6 (or by the location server 710 in stage 4) may be based on the status of ROs, e.g., whether the ROs are ON or OFF. For example, prioritization may be based on whether an RO 705 is reflecting PRS signals that will enhance positioning performance for the UE 704, where PRS signals associated with an RO that will enhance positioning performance is prioritized.

Whether an RO is reflecting PRS signals that will enhance positioning performance may be determined based on reflection properties of the RO, such as the AoA, AOD, Tx power, Tx beam information, or a combination thereof. For example, as discussed above, whether an RO 705 is reflecting PRS signals that will enhance positioning performance may be determined based on a variety of ways, such as whether the UE is configured with at least one of a pathloss reference signal, a spatial Rx reference signal, a Quasi Colocation (QCL) reference signal, or a combination thereof that includes the RO to be included in the determination of at least one of the pathloss measurement a Rx beam, a QCL beam, or a combination thereof. In another option, whether an RO 705 is reflecting PRS signals that will enhance positioning performance may be determined based on the AoD of the RO and whether the AoD is directed towards the UE. In another option, determining whether the RO is reflecting PRS signals that will enhance positioning performance for the UE may include whether the UE receives a request from a network entity to measure multipath components of a PRS resource associated with the RO, or whether the UE receives an expected signal strength uncertainty window for measuring multipath components of a PRS resource associated with the RO. Additionally, determining whether the RO is reflecting PRS signals that will enhance positioning performance for the UE may be based on whether the UE is capable of multipath detection and reporting. In some implementations, the prioritization for PRS signals may be based on a number of ROs associated with the PRS resource, PRS resource set, TRP, or a combination thereof.

In some implementations, the prioritization for PRS signals for measurement and/or reporting may be is based at least on the prioritization of the one or more ROs. For example, one or more ROs may be associated with multiple PRS resources, and the multiple PRS resources may be prioritized based on the priority of the RO to which they are associated. The prioritization of the one or more ROs may be provided based on an ordering of the ROs in a list of ROs or an identified prioritization configuration, e.g., in the positioning assistance data, or another message. The prioritization of the one or more ROs may be dynamically configured or semi-statically configured, and may be provided through unicast or broadcast. Moreover, the prioritization of the one or more ROs may be different positioning methods, positioning modes, or both. Further, in some implementations, the prioritization of ROs may be determined.

At stage 7, the UE 704 may determine at least one of positioning accuracy requirements, measurement accuracy, or a combination thereof for PRS resources based at least in part on an association with ROs. The positioning accuracy requirements or measurement accuracy may be based on whether the UE capabilities, such as whether the UE supports multipath detection and reporting. By way of example, the measurement accuracy may be accuracy requirements for at least one of AoA, AOD, RSRP, RSTD, or a combination thereof. The positioning accuracy requirements or measurement accuracy may be based on the status of the RO, such whether the RO (which may be a RIS) is ON. For example, the positioning accuracy requirements and/or measurement accuracy for PRS resources may not apply for PRS resources associated with a RIS that is ON. The positioning accuracy requirements and/or measurement accuracy may be determined based on whether an RO associated with a PRS resource is reflecting PRS signals that will enhance positioning performance for the UE, which may be determined based on reflection properties of the RO, and other factors, such as those discussed in stage 6. The positioning accuracy requirements and/or measurement accuracy may be different for ROs that reflect PRS signals that will enhance positioning performance for the UE and ROs that reflect PRS signals that will not enhance positioning performance for the UE.

It should be understood that stages 6 and 7 need not be performed together, and that if desired, stage 6 may be performed without stage 7 or stage 7 may be performed without stage 6.

At stage 8, the TRPs 702 transmit DL PRS signals, some of which may be reflected by the ROs 705. In some implementations, the UE 704 may transmit UL PRS signals, e.g., SRS, (not shown) to TRPs 702, some of which may be reflected by the ROs 705, for example, if a multi-RTT positioning method is to be performed.

At stage 9, the UE 704 may process and measure PRS signals from the TRPs 702 and reflected from ROs 705 at stage 8 according to the prioritization for the PRS signals and ROs, e.g., received with assistance data at stage 4 or determined at stage 6, and/or according to the measurement accuracy requirements determined at stage 7. The UE 704, for example, may measure TDOA and AoD.

At stage 10, if UE 704 based positioning was requested at stage 5, the UE 704 may determine its location based on the PRS measurements (and any other measurements) obtained at stage 9 and the assistance data received at stage 4. The location may be determined according to the positioning accuracy requirements determined at stage 7.

At stage 11, the UE 704 may send a Provide Location Information message to the location server 710 that may include the PRS measurements obtained at stage 9. The PRS measurements may be reported according to the prioritization for the PRS signals and ROs. If the UE 704 determined the UE location at stage 10, the Provide Location Information message may include the location estimate.

At stage 12, the location server 710 determines the UE location based on any PRS measurements (and any other measurements) received at stage 11, or may verify a UE location if also received at stage 11.

Figure 8:
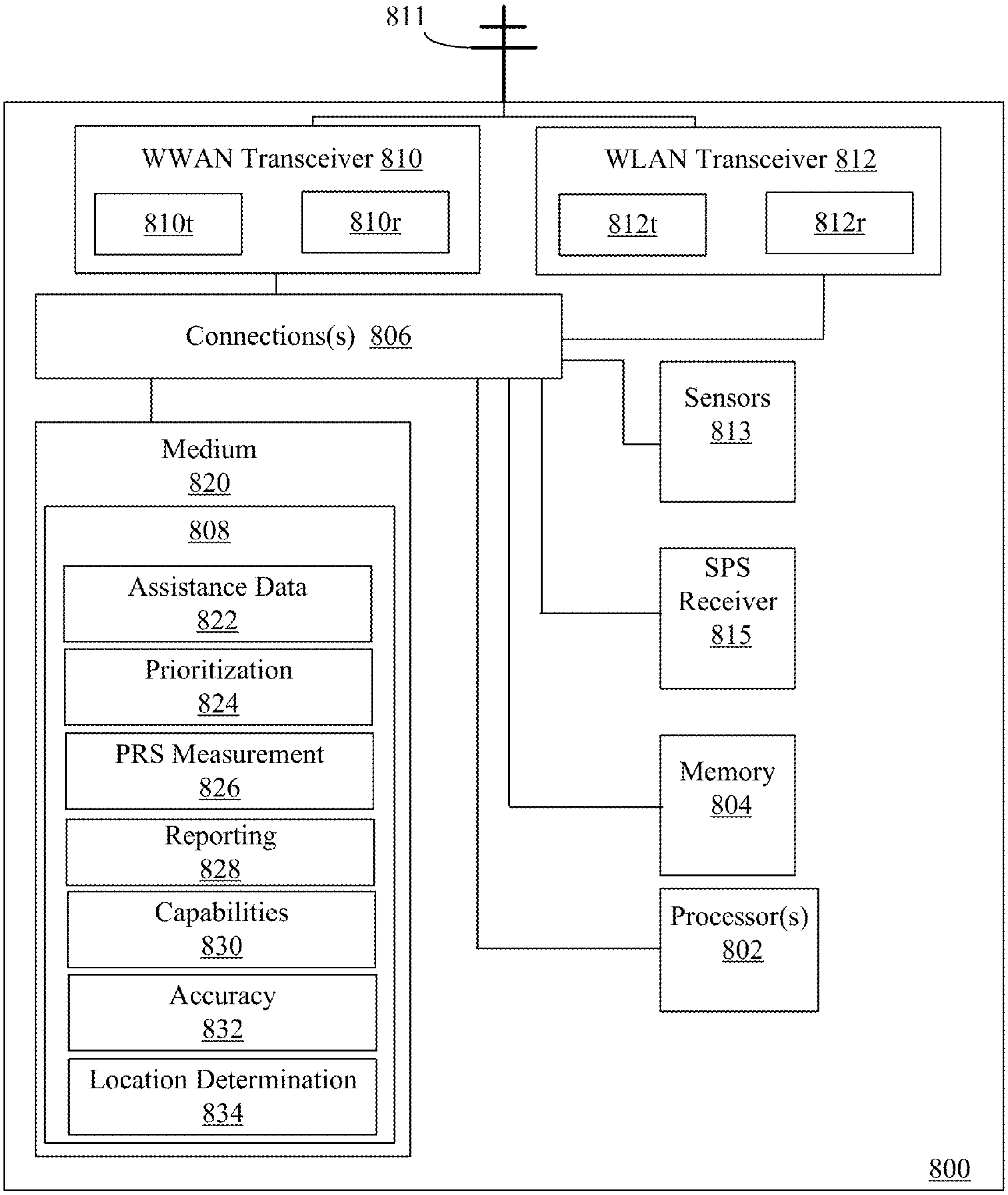
FIG. 8 shows a schematic block diagram illustrating certain exemplary features of a UE configured to support positioning using prioritization of PRS measurement and/or reporting based on information related to associated ROs.

FIG. 8 shows a schematic block diagram illustrating certain exemplary features of a UE 800, e.g., which may be UE 104, 404, 504, or 704, that is configured to support positioning using prioritization of PRS measurement and/or reporting based on information related to associated ROs, as discussed herein. The UE 800, for example, may perform the message flow 700 illustrated in FIG. 7 and the procedures 1000, 1200, and 1300 illustrated in FIGS. 10, 12, and 13 along with other algorithms discussed herein.

The UE 800 may, for example, include one or more processors 802, memory 804, an external interface such as at least one wireless transceivers (e.g., wireless network interface) illustrated as WWAN transceiver 810 and WLAN transceiver 812, satellite positioning system (SPS) receiver 815, and one or more sensors 813, which may be operatively coupled with one or more connections 806 (e.g., buses, lines, fibers, links, etc.) to non-transitory computer readable medium 820 and memory 804. The SPS receiver 815, for example, may receive and process SPS signals from satellite vehicles (SVs) to measure GNSS pseudorange, a GNSS codephase, a GNSS carrier phase, etc. The one or more sensors 813, for example, may be an inertial measurement unit (IMU) that may include one or more accelerometers, one or more gyroscopes, a magnetometer, barometer, etc. The UE 800 may further include additional items, which are not shown, such as a user interface that may include e.g., a display, a keypad or other input device, such as virtual keypad on the display, through which a user may interface with the UE. In certain example implementations, all or part of UE 800 may take the form of a chipset, and/or the like.

The UE 800 may include at least one wireless transceiver, such as transceiver 810 for a WWAN communication system and transceiver 812 for a WLAN communication system, or a combined a transceiver for both WWAN and WLAN. The WWAN transceiver 810 may include a transmitter **810*t* and receiver 810*r* coupled to one or more antennas 811 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 812 may include a transmitter 812*t* and receiver 812*r* coupled to one or more antennas 811 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 810*t* and 812*t* may include multiple transmitters that may be discrete components or combined/integrated components, and/or the receivers 810*r* and 812*r* may include multiple receivers that may be discrete components or combined/integrated components. The WWAN transceiver 810 may be configured to communicate signals (e.g., with base stations and/or one or more other devices) according to a variety of radio access technologies (RATs) such as 8G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHZ frequencies. The WLAN transceiver 812 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 810 and 812 may be communicatively coupled to a transceiver interface, e.g., by optical and/or electrical connection, which may be at least partially integrated with the transceivers 810 and 812**.

In some embodiments, UE 800 may include antenna 811, which may be internal or external. UE antenna 811 may be used to transmit and/or receive signals processed by wireless transceivers 810 and 812. In some embodiments, UE antenna 811 may be coupled to wireless transceivers 810 and 812. In some embodiments, measurements of signals received (transmitted) by UE 800 may be performed at the point of connection of the UE antenna 811 and wireless transceivers 810 and 812. For example, the measurement point of reference for received (transmitted) RF signal measurements may be an input (output) terminal of the receiver **810*r* (transmitter 810*t*) and an output (input) terminal of the UE antenna 811. In a UE 800 with multiple UE antennas 811 or antenna arrays, the antenna connector may be viewed as a virtual point representing the aggregate output (input) of multiple UE antennas. In some embodiments, UE 800 may measure received signals including signal strength and TOA measurements, and angle related measurements for DL PRS and/or SL PRS and the raw measurements may be processed by the one or more processors 802**, including RSTD, RSRP, RSRQ, AOD, AOA, Rx-Tx, etc., of DL NR signals from a gNB or RO, or SL SRS from a SL UE, or WiFi measurements such as RSSI, AOA or RTT, Bluetooth measurement such as RSSI, AOA or RTT, etc.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of UE 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in UE 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in UE 800 is merely exemplary, and as such the functionality of the modules and/or data structures may be combined, separated, and/or be structured in different ways depending upon the implementation of the UE 800.

The medium 820 and/or memory 804 may include an assistance data module 822 that when implemented by the one or more processors 802 configures the one or more processors 802 to receive from a location server, e.g., via one of the transceivers 810, 812, positioning assistance data including information for PRS resources, PRS resource sets, TRPs, or a combination thereof. The positioning assistance data further includes information for one or more ROs associated with one or more PRS resources, PRS resource sets, TRPs, or a combination thereof. The information for the ROs, for example, may include a prioritization of multiple ROs associated with at least one PRS resource. The information for the ROs, for example, may include whether a RO is reflecting PRS signals that will enhance positioning performance for the UE, and may include information such as the AoA, AoD, Tx power, Tx beam information, etc., as discussed herein.

The medium 820 and/or memory 804 may include a prioritization module 824 that when implemented by the one or more processors 802 configures the one or more processors 802 to prioritize PRS signals for the at least one of measurement, reporting, or the combination thereof, based at least on the information for the one or more ROs and/or to prioritize multiple ROs associated with the at least one PRS resource based at least on the information for the one or more ROs, e.g., as discussed herein.

The medium 820 and/or memory 804 may include a PRS measurement module 826 that when implemented by the one or more processors 802 configures the one or more processors 802 to obtain PRS measurements, e.g., via the transceivers 810, based on at least the prioritization of the PRS signals and/or the prioritization of the multiple ROs. The one or more processors 802 may be further configured to obtain PRS measurements based on a positioning accuracy requirements, which may be determined based at least in part on an association with ROs. The PRS measurements, for example, may include at least one of Reference Signal Time Difference (RSTD), Reference Signal Received Power (RSRP), Reference Signal Received Quality (RSRQ), carrier phase measurements for positioning, Angle of Departure (AOD), AOA, time difference between reception and transmission of signals (Rx-Tx), a measurement of sidelink signals from a sidelink UE comprising at least one of AOA, RSRP, Rx-Tx, TOA.

The medium 820 and/or memory 804 may include a reporting module 828 that when implemented by the one or more processors 802 configures the one or more processors 802 to send a report to a positioning entity (e.g., location server) for the PRS measurements, via the transceivers 810, 812, such as a PLI report, based on at least the prioritization of the PRS signals and/or the prioritization of the multiple ROs.

The medium 820 and/or memory 804 may include a capabilities module 830 that when implemented by the one or more processors 802 configures the one or more processors 802 to obtain and send a capabilities message to a location server, via the transceivers 810, 812, wherein the capabilities include, for example, whether the UE is capable of multipath detection and reporting.

The medium 820 and/or memory 804 may include an accuracy module 832 that when implemented by the one or more processors 802 configures the one or more processors 802 to determine positioning accuracy requirements and/or measurement accuracy for PRS resources based at least in part on an association with ROs, as discussed herein.

The medium 820 and/or memory 804 may include a location determination module 834 that when implemented by the one or more processors 802 configures the one or more processors 802 to determine an estimated location of the UE based at least partially on PRS measurements. The one or more processors 802 may be configured to determine the location of the UE, for example, based on positioning accuracy requirements determined based at least in part on an association with ROs.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program code 808. For example, the non-transitory computer readable medium including program code 808 stored thereon may include program code 808 to support positioning using prioritization of PRS measurement and/or reporting based on information related to associated ROs in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a wireless transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by one or more processors 802 may be operatively enabled to perform all or portions of the example operations as described herein. Computer readable medium 820 may be a part of memory 804.

Figure 9:
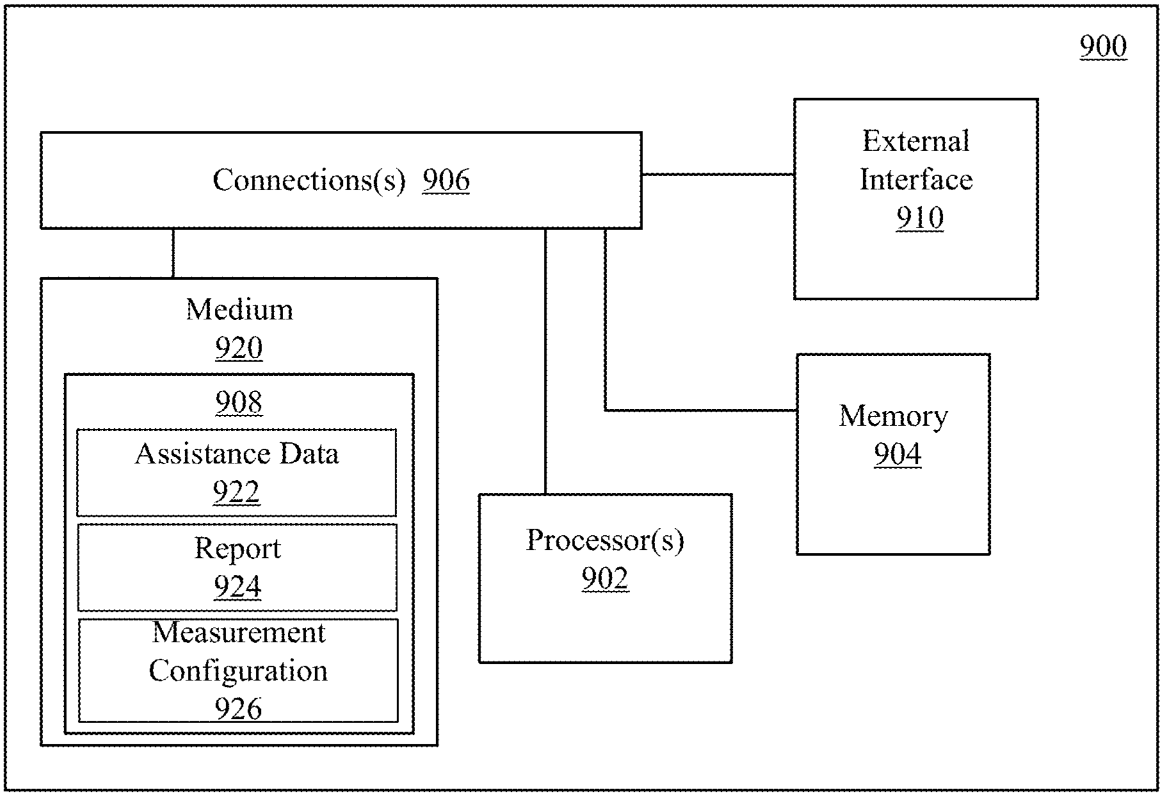
FIG. 9 shows a schematic block diagram illustrating certain exemplary features of a location server configured to support positioning using prioritization of PRS measurement and/or reporting based on information related to associated ROs.

FIG. 9 shows a schematic block diagram illustrating certain exemplary features of a location server 900 in a wireless network that is configured to support positioning using prioritization of PRS measurement and/or reporting based on information related to associated ROs, as discussed herein. The location server 900 may be location server 172, 230*a*, 230*b*, LMF 270, or location server 710. The location server 900 may be configured to perform the message flow 700 illustrated in FIG. 11 and the procedure 1100 illustrated in FIG. 11 along with other algorithms discussed herein.

The location server 900 may, for example, include one or more processors 902, memory 904, an external interface 910 (e.g., wireline or wireless network interface to base stations, UEs, and/or entities in the core network), which may be operatively coupled with one or more connections 906 (e.g., buses, lines, fibers, links, etc.) to non-transitory computer readable medium 920 and memory 904. In certain example implementations, all or part of location server 900 may take the form of a chipset, and/or the like. Depending on the implementation, the location server 900 may include additional components not illustrated herein.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of location server 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in location server 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in location server 900 is merely exemplary, and as such the functionality of the modules and/or data structures may be combined, separated, and/or be structured in different ways depending upon the implementation of the location server 900.

The medium 920 and/or memory 904 may include an assistance data module 922 that when implemented by the one or more processors 902 configures the one or more processors 902 to determine assistance data and to send the assistance data to a UE, e.g., via the external interface 910. The positioning assistance data including information for PRS resources, PRS resource sets, TRPs, or a combination thereof. The positioning assistance data further includes information for one or more ROs associated with one or more PRS resources, PRS resource sets, TRPs, or a combination thereof. The information for the ROs, for example, may include a prioritization of multiple ROs associated with at least one PRS resource. The information for the ROs, for example, may include whether a RO is reflecting PRS signals that will enhance positioning performance for the UE, and may include information such as the AoA, AoD, Tx power, Tx beam information, etc., as discussed herein.

The medium 920 and/or memory 904 may include a report module 924 that when implemented by the one or more processors 902 configures the one or more processors 902 to receive a report of measurements of PRS signals from a UE, via the external interface 910 such as a PLI report. The measurements of PRS signals and/or the report is prioritized based on at least the prioritization of the PRS signals and/or the prioritization of the multiple ROs, as discussed herein.

The medium 920 and/or memory 904 may include a measurement configuration module 926 that when implemented by the one or more processors 902 configures the one or more processors 902 to send a request to measure multipath components of one or more PRS resources and/or send an expected signal strength uncertainty window for measuring multipath components of one or more PRS resources, via the external interface 910.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program code 908. For example, the non-transitory computer readable medium including program code 908 stored thereon may include program code 908 to support positioning using prioritization of PRS measurement and/or reporting based on information related to associated ROs in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include an external interface 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
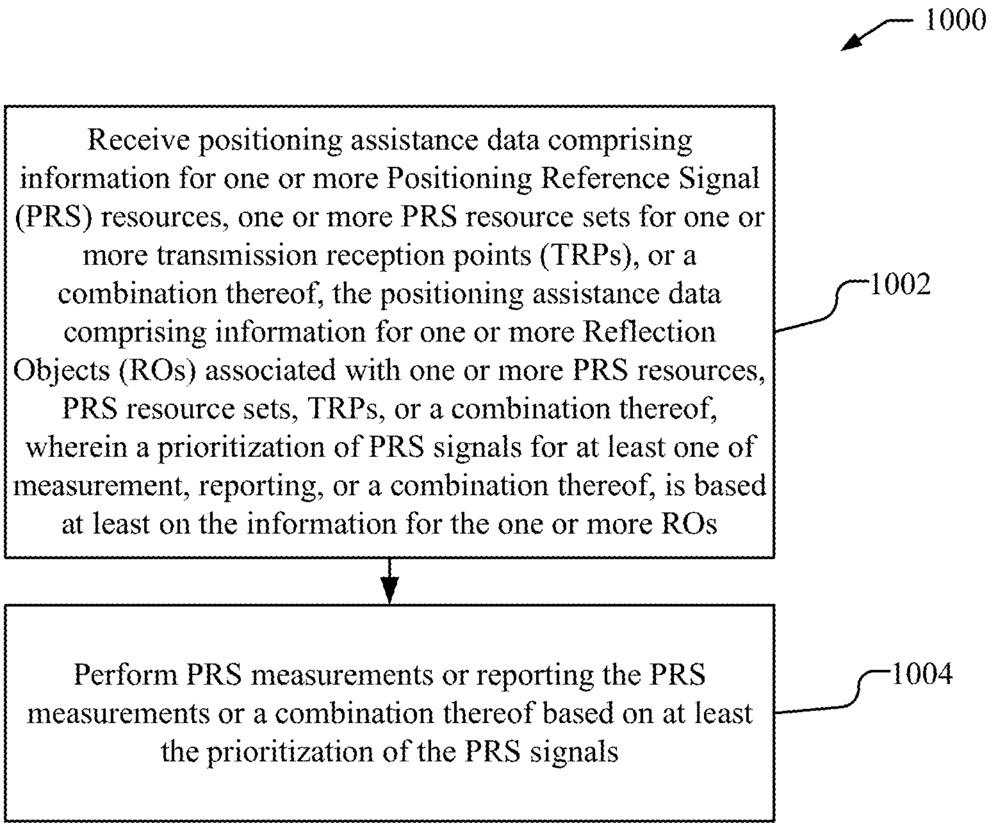
FIG. 10 shows a flowchart for an exemplary process performed by a UE for position determination of the UE in a manner consistent with disclosed implementations.

FIG. 10 shows a flowchart for an exemplary process 1000 for position determination of the UE performed by a UE, such as UE 104, 404, 504, 704, 800 as illustrated in FIGS. 1A, 4, 5, 7, and 8 and in a manner consistent with disclosed implementations.

At block 1002, the UE receives positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs, e.g., as discussed at stages 3 and 4 of FIG. 7. In some implementations, the one or more ROs may be one or more Reconfiguration Intelligent Surfaces (RISs). A means for receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs may include, e.g., one or more of the transceivers 810, 812 and one or more processors 802 with dedicated hardware or implementing executable code or software instructions in memory 804 and/or medium 820 in UE 800, such as the assistance data module 822, shown in FIG. 8.

At block 1004, the UE performs PRS measurements or reporting the PRS measurements or a combination thereof based on at least the prioritization of the PRS signals, e.g., as discussed at stages 6, 9, and 11 of FIG. 7. A means for performing PRS measurements or reporting the PRS measurements or a combination thereof based on at least the prioritization of the PRS signals may include, e.g., one or more of the transceivers 810, 812 and one or more processors 802 with dedicated hardware or implementing executable code or software instructions in memory 804 and/or medium 820 in UE 800, such as the prioritization module 824, PRS measurement module 826, and reporting module 828, shown in FIG. 8.

In some implementations, the information for the one or more ROs may include a prioritization of multiple ROs associated with at least one PRS resource, e.g., as discussed at stage 3 of FIG. 7. The UE may further determine the prioritization for the multiple ROs associated with the at least one PRS resource based at least on the information for the one or more ROs, e.g., as discussed at stage 6 of FIG. 7. A means for determining the prioritization for the multiple ROs associated with the at least one PRS resource based at least on the information for the one or more ROs may include, e.g., one or more processors 802 with dedicated hardware or implementing executable code or software instructions in memory 804 and/or medium 820 in UE 800, such as the prioritization module 824, shown in FIG. 8.

In some implementations, the UE may determine the prioritization for PRS signals for the at least one of measurement, reporting, or the combination thereof, based at least on the information for the one or more ROs, e.g., as discussed at stages 3 and 4 of FIG. 7. A means for determine the prioritization for PRS signals for the at least one of measurement, reporting, or the combination thereof, based at least on the information for the one or more ROs may include, e.g., one or more processors 802 with dedicated hardware or implementing executable code or software instructions in memory 804 and/or medium 820 in UE 800, such as the prioritization module 824, shown in FIG. 8. In some implementations, the UE may determine prioritization by determining whether PRS signals reflected by an RO will enhance positioning performance for the UE, and prioritizing PRS signals associated with any RO that will enhance positioning performance, e.g., as discussed at stage 6 of FIG. 7. A means for determining whether an PRS signals reflected by an RO will enhance positioning performance for the UE, and prioritizing PRS signals associated with any RO that will enhance positioning performance may include, e.g., one or more processors 802 with dedicated hardware or implementing executable code or software instructions in memory 804 and/or medium 820 in UE 800, such as the prioritization module 824, shown in FIG. 8.

For example, in some implementations, whether the PRS signals reflected by the RO will enhance positioning performance for the UE may be determined based on reflection properties of the RO comprising at least one of Angle of Arrival, Angle of Departure, Transmission (Tx) power, Tx beam information, or a combination thereof. In some implementations, the UE may determine whether the RO is reflecting PRS signals that will enhance positioning performance for the UE by determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE, e.g., as discussed at stage 6 of FIG. 7. A means for determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE may include, e.g., one or more processors 802 with dedicated hardware or implementing executable code or software instructions in memory 804 and/or medium 820 in UE 800, such as the prioritization module 824, shown in FIG. 8.

In some implementations, the UE may determine whether the PRS signals reflected by the RO will enhance positioning performance for the UE by receiving a request from a network entity to measure multipath components of a PRS resource associated with the RO, e.g., as discussed at stage 6 of FIG. 7. A means for determining whether the PRS signals reflected by the RO will enhance positioning performance for the UE by receiving a request from a network entity to measure multipath components of a PRS resource associated with the RO may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8. In some implementations, the UE may determine whether the PRS signals reflected by the RO will enhance positioning performance for the UE by receiving an expected signal strength uncertainty window for measuring multipath components of a PRS resource associated with the RO, e.g., as discussed at stage 6 of FIG. 7. A means for determining whether the PRS signals reflected by the RO will enhance positioning performance for the UE comprises receiving an expected signal strength uncertainty window for measuring multipath components of a PRS resource associated with the RO may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8. In some implementations, the UE may determine whether the PRS signals reflected by the RO will enhance positioning performance for the UE by determining the UE is capable of multipath detection and reporting, e.g., as discussed at stage 6 of FIG. 7. A means for determining whether the PRS signals reflected by the RO will enhance positioning performance for the UE by determining the UE is capable of multipath detection and reporting may include, e.g., one or more of the transceivers 810, 812 and one or more processors 802 with dedicated hardware or implementing executable code or software instructions in memory 804 and/or medium 820 in UE 800, such as the capabilities module 830 and the prioritization module 824, shown in FIG. 8. In some implementations, the UE may determine whether the PRS signals reflected by the RO will enhance positioning performance for the UE using any combination of the foregoing.

In some implementations, the UE may determine the prioritization for PRS signals for the at least one of measurement, reporting, or the combination thereof, based at least on the information for the one or more ROs based on a number of ROs associated with the PRS resource, PRS resource set, TRP, or a combination thereof, e.g., as discussed at stage 6 of FIG. 7.

In some implementations, the information for the one or more PRS resources, the one or more PRS resource sets, the one or more TRPs, or the combination thereof further may include a prioritization of one or more ROs, and the UE may determine the prioritization for PRS signals for the at least one of measurement, reporting, or the combination thereof further based at least on the prioritization of the one or more ROs, e.g., as discussed at stages 3, 4, and 6 of FIG. 7. For example, the one or more ROs may be associated with multiple PRS resources, and the multiple PRS resources are prioritized based on the prioritization of the RO to which they are associated. The prioritization of the one or more ROs, for example, may be provided based on an ordering of the ROs in a list of ROs or an identified prioritization configuration. The prioritization of the one or more ROs may be at least one of dynamically configured, or semi-statically configured. The positioning assistance data including the prioritization of the one or more ROs may be unicast or broadcast. In some implementations, the prioritization of the one or more ROs may be different for at least one of different positioning methods, positioning modes, or a combination thereof.

Figure 11:
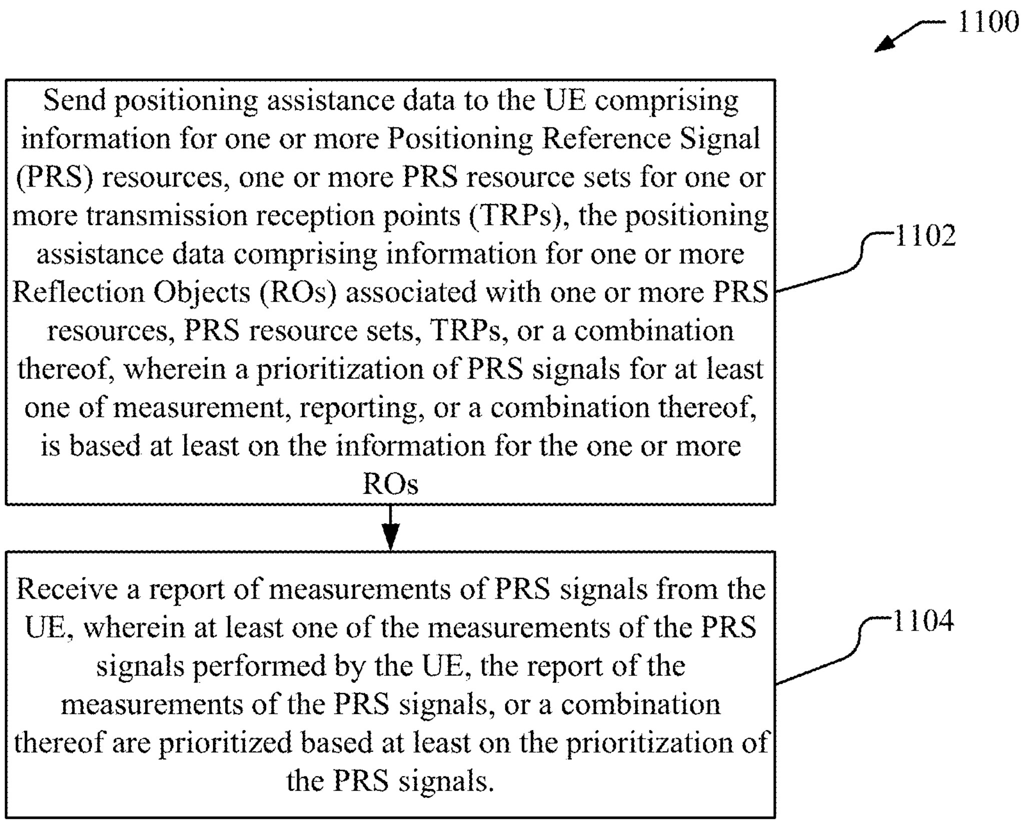
FIG. 11 shows a flowchart for an exemplary process performed by a location server for position determination of the UE in a manner consistent with disclosed implementations.

FIG. 11 shows a flowchart for an exemplary process 1100 for position determination of the UE performed by a location server, such as location server 172, 230*a*, 230*b*, LMF 270, 710, or 900 as illustrated in FIGS. 1A, 2A, 2B, 4, 5, 7, and 9, and in a manner consistent with disclosed implementations.

At block 1102, the location server sends positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs, e.g., as discussed at stages 3 and 4 of FIG. 7. In some implementations, the one or more ROs may be one or more Reconfiguration Intelligent Surfaces (RISs). A means for sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs may include, e.g., the external interface 910 and one or more processors 902 with dedicated hardware or implementing executable code or software instructions in memory 904 and/or medium 920 in location server 900, such as the assistance data module 922, shown in FIG. 9.

At block 1104, the location server receives a report of measurements of PRS signals from the UE, wherein at least one of the measurements of the PRS signals performed by the UE, the report of the measurements of the PRS signals, or a combination thereof are prioritized based at least on the prioritization of the PRS signals, e.g., as discussed at stages 9 and 11 of FIG. 7. A means for receiving a report of measurements of PRS signals from the UE, wherein at least one of the measurements of the PRS signals performed by the UE, the report of the measurements of the PRS signals, or a combination thereof are prioritized based at least on the prioritization of the PRS signals may include, e.g., the external interface 910 and one or more processors 902 with dedicated hardware or implementing executable code or software instructions in memory 904 and/or medium 920 in location server 900, such as the report module 924, shown in FIG. 9.

In some implementations, the information for the one or more ROs may include a prioritization of multiple ROs associated with at least one PRS resource, e.g., as discussed at stage 3 of FIG. 7. In some implementations, the UE determines the prioritization for the multiple ROs associated with one PRS resource based at least on the information for the one or more ROs, e.g., as discussed at stage 6 of FIG. 7. In some implementations, the UE may determine a prioritization for PRS signals for the at least one of measurement, reporting, or the combination thereof, based at least on the information for the one or more ROs. The prioritization for PRS signals for the at least one of measurement, reporting, or the combination thereof, may be determined based on whether PRS signals associated with an RO will enhance positioning performance for the UE, e.g., as discussed at stage 6 of FIG. 7.

In some implementations, whether PRS signals associated with the RO will enhance positioning performance for the UE may be determined based on the UE being configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE, e.g., as discussed at stage 6 of FIG. 7.

In some implementations, the location server may send a request to measure multipath components of one or more PRS resources and whether PRS signals associated with any RO will enhance positioning performance for the UE may be determined based on the request to measure the multipath components of a PRS resource that is associated with the RO, e.g., as discussed at stage 6 of FIG. 7. A means for sending a request to measure multipath components of one or more PRS resources may include, e.g., the external interface 910 and one or more processors 902 with dedicated hardware or implementing executable code or software instructions in memory 904 and/or medium 920 in location server 900, such as the measurement configuration module 926, shown in FIG. 9.

In some implementations, the location server may send an expected signal strength uncertainty window for measuring multipath components of one or more PRS resources, and whether PRS signals associated with any RO will enhance positioning performance for the UE is determined may be based on the expected signal strength uncertainty window for measuring the multipath components of a PRS resource that is associated with the RO, e.g., as discussed at stage 6 of FIG. 7. A means for sending an expected signal strength uncertainty window for measuring multipath components of one or more PRS resources may include, e.g., the external interface 910 and one or more processors 902 with dedicated hardware or implementing executable code or software instructions in memory 904 and/or medium 920 in location server 900, such as the measurement configuration module 926, shown in FIG. 9.

In some implementations, whether PRS signals associated with any RO will enhance positioning performance for the UE may be determined based on the UE being capable of multipath detection and reporting, e.g., as discussed at stage 6 of FIG. 7.

In some implementations, prioritization for PRS signals for the at least one of measurement, reporting, or the combination thereof, is determined based at least on the information for the one or more ROs is based on a number of ROs associated with the PRS resource, PRS resource set, TRP, or a combination thereof, e.g., as discussed at stage 6 of FIG. 7.

In some implementations, the information for the one or more PRS resource, the one or more PRS resource sets, the one or more TRPs, or the combination thereof may further include a prioritization of one or more ROs, and the prioritization for PRS signals for the at least one of measurement, reporting, or the combination thereof is determined based at least on the prioritization of the one or more ROs, e.g., as discussed at stage 6 of FIG. 7. For example, the one or more ROs are associated with multiple PRS resources, and wherein the multiple PRS resources are prioritized based on the prioritization of the RO to which they are associated. The prioritization of the one or more ROs, for example, may be provided based on one or more of an ordering of the ROs in a list of ROs or an identified prioritization configuration, a dynamic configuration, a semi-static configuration, or a combination thereof. The positioning assistance data including the prioritization of the one or more ROs may be unicast or broadcast. In some implementations, the prioritization of the one or more ROs may be different for at least one of different positioning methods, positioning modes, or a combination thereof.

Figure 12:
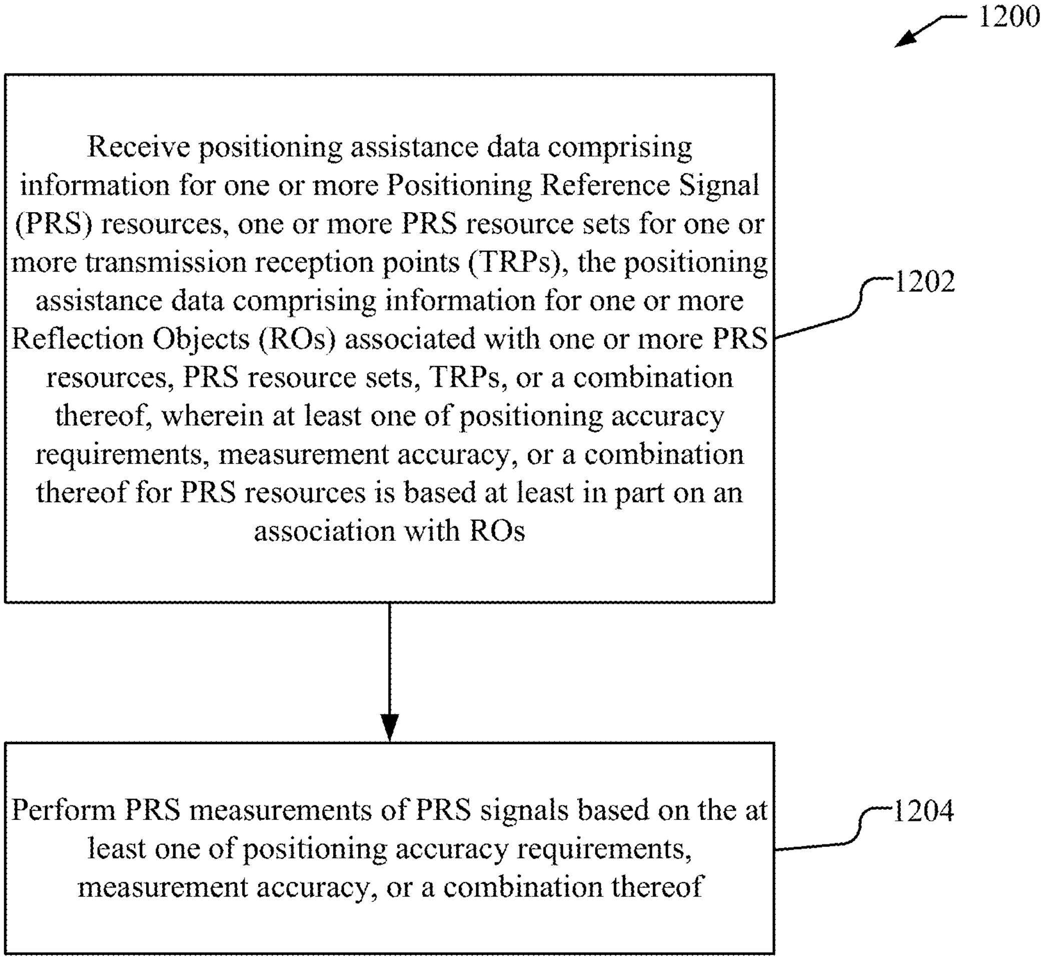
FIG. 12 shows a flowchart for an exemplary process performed by a UE for position determination of the UE in a manner consistent with disclosed implementations.

FIG. 12 shows a flowchart for an exemplary process 1200 for position determination of the UE performed by a UE, such as UE 104, 404, 504, 704, 800 as illustrated in FIGS. 1A, 4, 5, 7, and 8 and in a manner consistent with disclosed implementations.

At block 1202, the UE receives positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs, e.g., as discussed at stages 3 and 4 of FIG. 7. A means for receiving positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs may include, e.g., one or more of the transceivers 810, 812 and one or more processors 802 with dedicated hardware or implementing executable code or software instructions in memory 804 and/or medium 820 in UE 800, such as the assistance data module 822, shown in FIG. 8.

At block 1204, the UE performs PRS measurements of PRS signals based on the determined at least one of positioning accuracy requirements, measurement accuracy, or a combination thereof, e.g., as discussed at stages 9 and 10 of FIG. 7. A means for performing PRS measurements of PRS signals based on the determined at least one of positioning accuracy requirements, measurement accuracy, or a combination thereof may include, e.g., one or more of the transceivers 810, 812 and one or more processors 802 with dedicated hardware or implementing executable code or software instructions in memory 804 and/or medium 820 in UE 800, such as the PRS measurement module 826, and location determination module 834, shown in FIG. 8.

In some implementations, the UE may determine the at least one of positioning accuracy requirements, measurement accuracy, or a combination thereof for the PRS resources based at least in part on an association with ROs, e.g., as discussed at stage 7 of FIG. 7. In some implementations, the at least one of positioning accuracy requirements, measurement accuracy, or the combination thereof may include accuracy requirements for measurement of at least one of Angle of Arrival (AoA), Angle of Departure (AoD), Reference Signal Received Power (RSRP), Reference Signal Time Difference (RSTD), or a combination thereof. A means for determining the at least one of positioning accuracy requirements, measurement accuracy, or a combination thereof for the PRS resources based at least in part on an association with ROs may include, e.g., one or more processors 802 with dedicated hardware or implementing executable code or software instructions in memory 804 and/or medium 820 in UE 800, such as the accuracy module 832, shown in FIG. 8.

In some implementations, the UE determines the at least one of positioning accuracy requirements, measurement accuracy, or the combination thereof for PRS resources further based on whether the UE supports multipath detection and reporting, e.g., as discussed at stage 7 of FIG. 7.

In some implementations, the one or more ROs may be one or more Reconfiguration Intelligent Surfaces (RISs). The at least one of positioning accuracy requirements, measurement accuracy, or the combination thereof for PRS resources is further based on whether the RIS is ON, e.g., as discussed in stage 7 of FIG. 7.

In some implementations, the at least one of positioning accuracy requirements, measurement accuracy, or the combination thereof for PRS resources is based on whether PRS signals reflected by an RO will enhance positioning performance for the UE, e.g., as discussed at stage 7 of FIG. 7. For example, whether PRS signals reflected by an RO will enhance positioning performance for the UE may be determined based on reflection properties of the RO comprising at least one of Angle of Arrival (AoA), Angle of Departure (AoD), Transmission (Tx) power, Tx beam information, or a combination thereof. In some implementations, the at least one of positioning accuracy requirements, measurement accuracy, or the combination thereof is different for ROs that reflect PRS signals that will enhance positioning performance for the UE and ROs that reflect PRS signals that will not enhance positioning performance for the UE.

Figure 13:
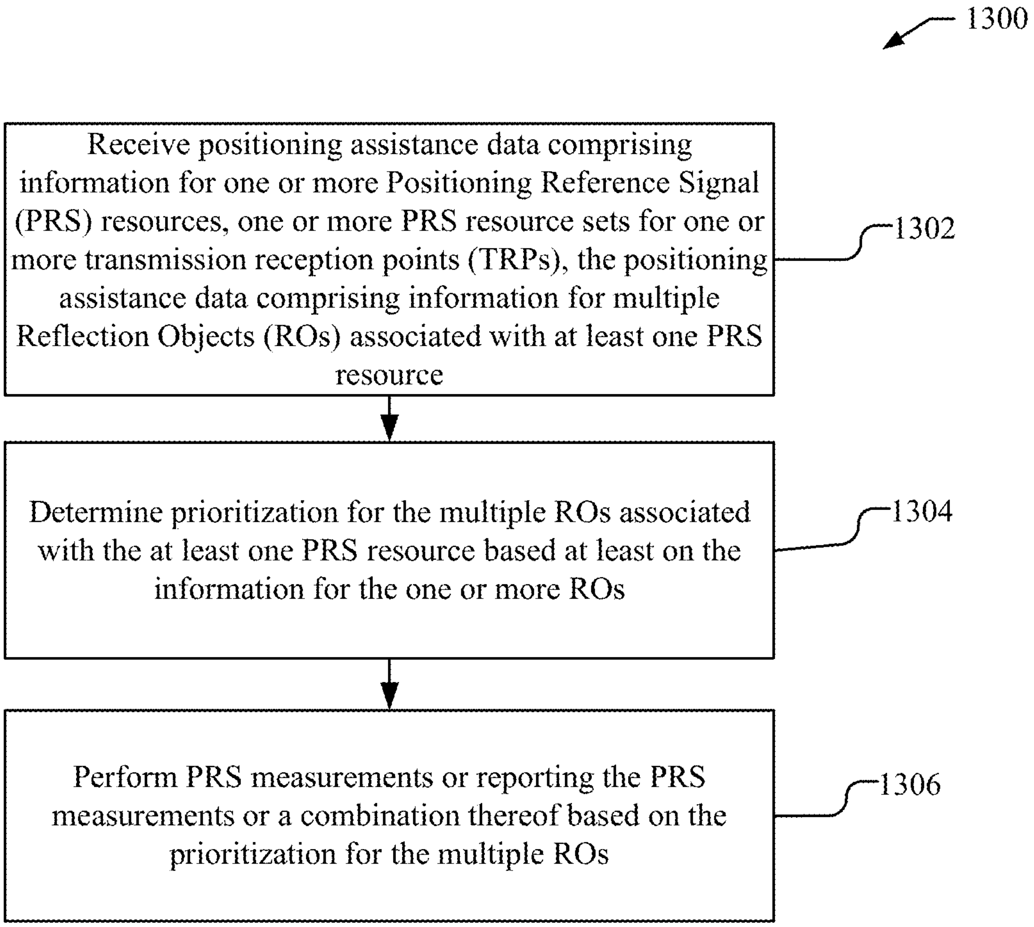
FIG. 13 shows a flowchart for an exemplary process performed by a UE for position determination of the UE in a manner consistent with disclosed implementations.

FIG. 13 shows a flowchart for an exemplary process 1300 for position determination of the UE performed by a UE, such as UE 104, 404, 504, 704, 800 as illustrated in FIGS. 1A, 4, 5, 7, and 8 and in a manner consistent with disclosed implementations.

At block 1302, the UE receives positioning assistance data comprising information for one or more Positioning Reference Signal (PRS) resources, one or more PRS resource sets for one or more transmission reception points (TRPs), the positioning assistance data comprising information for multiple Reflection Objects (ROs) associated with at least one PRS resource, e.g., as discussed at stages 3 and 4 of FIG. 7. In some implementations, the one or more ROs may be one or more Reconfiguration Intelligent Surfaces (RISs). A means for receiving positioning assistance data comprising information for one or more Positioning Reference Signal (PRS) resources, one or more PRS resource sets for one or more transmission reception points (TRPs), the positioning assistance data comprising information for multiple Reflection Objects (ROs) associated with at least one PRS resource may include, e.g., one or more of the transceivers 810, 812 and one or more processors 802 with dedicated hardware or implementing executable code or software instructions in memory 804 and/or medium 820 in UE 800, such as the assistance data module 822, shown in FIG. 8.

At block 1304, the UE determines prioritization for the multiple ROs associated with the at least one PRS resource based at least on the information for the one or more ROs, e.g., as discussed at stage 6 of FIG. 7. A means for determining prioritization for the multiple ROs associated with the at least one PRS resource based at least on the information for the one or more ROs may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8.

At block 1306, the UE performs PRS measurements or reporting the PRS measurements or a combination thereof based on the prioritization for the multiple ROs, e.g., as discussed at stages 6, 9, and 11 of FIG. 7. A means for performing PRS measurements or reporting the PRS measurements or a combination thereof based on the prioritization for the multiple ROs may include, e.g., one or more of the transceivers 810, 812 and one or more processors 802 with dedicated hardware or implementing executable code or software instructions in memory 804 and/or medium 820 in UE 800, such as the PRS measurement module 826, and reporting module 828, shown in FIG. 8.

In some implementations, the UE determines the prioritization for the multiple ROs associated with the at least one PRS resource based at least on the information for the one or more ROs by determining whether an RO is reflecting PRS signals that will enhance positioning performance for the UE, and prioritizing an RO that is reflecting PRS signals that will enhance positioning performance, e.g., as discussed at stage 6 of FIG. 7. A means for determining the prioritization for the multiple ROs associated with the at least one PRS resource based at least on the information for the one or more ROs by determining whether an RO is reflecting PRS signals that will enhance positioning performance for the UE, and prioritizing an RO that is reflecting PRS signals that will enhance positioning performance may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8.

In some implementations, UE determines whether the RO is reflecting PRS signals that will enhance positioning performance for the UE based on reflection properties of the RO comprising at least one of Angle of Arrival, Angle of Departure, Transmission (Tx) power, Tx beam information, or a combination thereof. In some implementations, the UE may determine whether the RO is reflecting PRS signals that will enhance positioning performance for the UE by determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE, e.g., as discussed at stage 6 of FIG. 7. A means for determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE may include, e.g., one or more processors 802 with dedicated hardware or implementing executable code or software instructions in memory 804 and/or medium 820 in UE 800, such as the prioritization module 824, shown in FIG. 8.

In some implementations, the UE determine whether the RO is reflecting PRS signals that will enhance positioning performance for the UE by receiving a request from a network entity to measure multipath components of a PRS resource associated with the RO, e.g., as discussed at stage 6 of FIG. 7. A means for determining whether the RO is reflecting PRS signals that will enhance positioning performance for the UE by receiving a request from a network entity to measure multipath components of a PRS resource associated with the RO may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8.

In some implementations, the UE determines whether the RO is reflecting PRS signals that will enhance positioning performance for the UE comprises receiving an expected signal strength uncertainty window for measuring multipath components of a PRS resource associated with the RO, e.g., as discussed at stage 6 of FIG. 7. A means for determining whether the RO is reflecting PRS signals that will enhance positioning performance for the UE comprises receiving an expected signal strength uncertainty window for measuring multipath components of a PRS resource associated with the RO may include, e.g., one or more of the transceivers 810, 812 and one or more processors 802 with dedicated hardware or implementing executable code or software instructions in memory 804 and/or medium 820 in UE 800, such as the prioritization module 824, shown in FIG. 8.

In some implementations, the UE may determine whether the RO is reflecting PRS signals that will enhance positioning performance for the UE by determining the UE is capable of multipath detection and reporting, e.g., as discussed at stage 6 of FIG. 7. A means for determining whether the RO is reflecting PRS signals that will enhance positioning performance for the UE by determining the UE is capable of multipath detection and reporting may include, e.g., one or more of the transceivers 810, 812 and one or more processors 802 with dedicated hardware or implementing executable code or software instructions in memory 804 and/or medium 820 in UE 800, such as the capabilities module 830 and the prioritization module 824, shown in FIG. 8.

Figure 14:
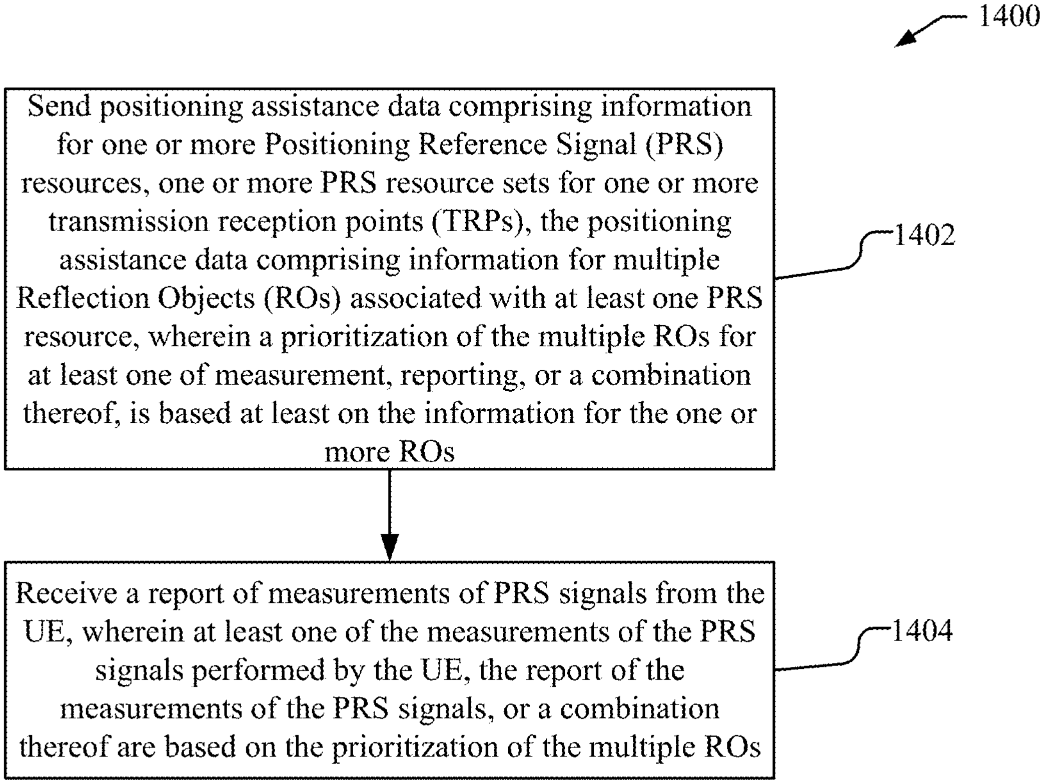
FIG. 14 shows a flowchart for an exemplary process performed by a location server for position determination of the UE in a manner consistent with disclosed implementations.

FIG. 14 shows a flowchart for an exemplary process 1400 for position determination of the UE performed by a location server, such as location server 172, 230*a*, 230*b*, LMF 270, 710, or 900 as illustrated in FIGS. 1A, 2A, 2B, 4, 5, 7, and 9, and in a manner consistent with disclosed implementations.

At block 1402, the location server sends positioning assistance data comprising information for one or more Positioning Reference Signal (PRS) resources, one or more PRS resource sets for one or more transmission reception points (TRPs), the positioning assistance data comprising information for multiple Reflection Objects (ROs) associated with at least one PRS resource, wherein a prioritization of the multiple ROs for at least one of measurement, reporting, or a combination thereof, is based at least on the information for the one or more ROs, e.g., as discussed at stages 3 and 4 of FIG. 7. In some implementations, the one or more ROs may be one or more Reconfiguration Intelligent Surfaces (RISs). A means for sending positioning assistance data comprising information for one or more Positioning Reference Signal (PRS) resources, one or more PRS resource sets for one or more transmission reception points (TRPs), the positioning assistance data comprising information for multiple Reflection Objects (ROs) associated with at least one PRS resource, wherein a prioritization of the multiple ROs for at least one of measurement, reporting, or a combination thereof, is based at least on the information for the one or more ROs may include, e.g., the external interface 910 and one or more processors 902 with dedicated hardware or implementing executable code or software instructions in memory 904 and/or medium 920 in location server 900, such as the assistance data module 922, shown in FIG. 9.

At block 1404, the location server receives a report of measurements of PRS signals from the UE, wherein at least one of the measurements of the PRS signals performed by the UE, the report of the measurements of the PRS signals, or a combination thereof are based on the prioritization of the multiple ROs, e.g., as discussed at stages 9 and 11 of FIG. 7. A means for receiving a report of measurements of PRS signals from the UE, wherein at least one of the measurements of the PRS signals performed by the UE, the report of the measurements of the PRS signals, or a combination thereof are based on the prioritization of the multiple ROs may include, e.g., the external interface 910 and one or more processors 902 with dedicated hardware or implementing executable code or software instructions in memory 904 and/or medium 920 in location server 900, such as the report data module 924, shown in FIG. 9.

In some implementations, the UE determines the prioritization for the multiple ROs associated with one PRS resource based at least on the information for the one or more ROs, e.g., as discussed at stage 6 of FIG. 7. The prioritization for PRS signals for the at least one of measurement, reporting, or the combination thereof, may be determined based on whether an RO is reflecting PRS signals that will enhance positioning performance for the UE, e.g., as discussed at stage 6 of FIG. 7. In some implementations, whether the RO is reflecting PRS signals that will enhance positioning performance for the UE may be determined based on reflection properties of the RO comprising at least one of Angle of Arrival, Angle of Departure, Transmission (Tx) power, Tx beam information, or a combination thereof.

In some implementations, whether the RO is reflecting PRS signals that will enhance positioning performance for the UE may be determined based on the UE being configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE, e.g., as discussed at stage 6 of FIG. 7.

In some implementations, the location server may send a request to measure multipath components of one or more PRS resources and whether the RO is reflecting PRS signals that will enhance positioning performance for the UE may be determined based on the request to measure the multipath components of a PRS resource that is associated with the RO, e.g., as discussed at stage 6 of FIG. 7. A means for sending a request to measure multipath components of one or more PRS resources may include, e.g., the external interface 910 and one or more processors 902 with dedicated hardware or implementing executable code or software instructions in memory 904 and/or medium 920 in location server 900, such as the measurement configuration module 926, shown in FIG. 9.

In some implementations, the location server may send an expected signal strength uncertainty window for measuring multipath components of one or more PRS resources, and whether the RO is reflecting PRS signals that will enhance positioning performance for the UE is determined may be based on the expected signal strength uncertainty window for measuring the multipath components of a PRS resource that is associated with the RO, e.g., as discussed at stage 6 of FIG. 7. A means for sending an expected signal strength uncertainty window for measuring multipath components of one or more PRS resources may include, e.g., the external interface 910 and one or more processors 902 with dedicated hardware or implementing executable code or software instructions in memory 904 and/or medium 920 in location server 900, such as the measurement configuration module 926, shown in FIG. 9.

In some implementations, whether the RO is reflecting PRS signals that will enhance positioning performance for the UE may be determined based on the UE being capable of multipath detection and reporting, e.g., as discussed at stage 6 of FIG. 7.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) in a wireless network for position determination of the UE, comprising: receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and performing PRS measurements or reporting the PRS measurements or a combination thereof based on at least the prioritization of the PRS signals.

Clause 2. The method of clause 1, wherein the one or more ROs comprise one or more Reconfiguration Intelligent Surfaces (RISs).

Clause 3. The method of any of clauses 1-2, wherein the information for the one or more ROs comprises a prioritization of multiple ROs associated with at least one PRS resource.

Clause 4. The method of clause 3, further comprising determining the prioritization for the multiple ROs associated with the at least one PRS resource based at least on the information for the one or more ROs.

Clause 5. The method of any of clauses 1-4, further comprising determining the prioritization for PRS signals for the at least one of measurement, reporting, or the combination thereof, based at least on the information for the one or more ROs.

Clause 5.5. The method of any of clause 5, wherein determining whether PRS signals reflected by an RO will enhance positioning performance for the UE, and prioritizing PRS signals associated with any RO that will enhance positioning performance.

Clause 6. The method of clause 5.5, wherein whether the PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

Clause 7. The method of any of clauses 5.5-6, wherein determining whether the PRS signals reflected by the RO will enhance positioning performance for the UE comprises determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE.

Clause 8. The method of any of clauses 5.5-7, wherein determining whether the PRS signals reflected by the RO will enhance positioning performance for the UE comprises at least one of receiving a request from a network entity to measure multipath components of a PRS resource associated with the RO, receiving an expected signal strength uncertainty window for measuring multipath components of a PRS resource associated with the RO, determining the UE is capable of multipath detection and reporting, or a combination thereof.

Clause 9. The method of any of clauses 5-8, wherein determining the prioritization for PRS signals for the at least one of measurement, reporting, or the combination thereof, based at least on the information for the one or more ROs is based on a number of ROs associated with the PRS resource, PRS resource set, TRP, or a combination thereof.

Clause 10. The method of any of clauses 1-9, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

Clause 11. The method of clause 10, wherein the one or more ROs are associated with multiple PRS resources, and wherein the multiple PRS resources are prioritized based on the prioritization of the RO to which they are associated.

Clause 12. The method of any of clauses 10-11, wherein the prioritization of the one or more ROs is provided based on an ordering of the ROs in a list of ROs or an identified prioritization configuration.

Clause 13. The method of any of clauses 10-12, wherein the prioritization of the one or more ROs is at least one of dynamically configured, or semi-statically configured.

Clause 14. The method of any of clauses 10-13, wherein the positioning assistance data comprising the prioritization of the one or more ROs is unicast or broadcast.

Clause 15. The method of any of clauses 10-14, wherein the prioritization of the one or more ROs is different for at least one of different positioning methods, positioning modes, or a combination thereof.

Clause 16. A user equipment (UE) in a wireless network configured for position determination of the UE, comprising: a wireless transceiver configured to wirelessly communicate with entities in a wireless network; at least one memory; and at least one processor coupled to the wireless transceiver and the at least one memory and configured to: receive, via the wireless transceiver, positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and perform PRS measurements or reporting the PRS measurements or a combination thereof based on at least the prioritization of the PRS signals.

Clause 17. The UE of clause 16, wherein the one or more ROs comprise one or more Reconfiguration Intelligent Surfaces (RISs).

Clause 18. The UE of any of clauses 16-17, wherein the information for the one or more ROs comprises a prioritization of multiple ROs associated with at least one PRS resource.

Clause 19. The UE of clause 18, wherein the at least one processor is further configured to determine the prioritization for the multiple ROs associated with the at least one PRS resource based at least on the information for the one or more ROs.

Clause 20. The UE of any of clauses 16-19, wherein the at least one processor is further configured to determine the prioritization for PRS signals for the at least one of measurement, reporting, or the combination thereof, based at least on the information for the one or more ROs.

Clause 20.5. The UE of clause 20, wherein the at least one processor is configured to determine the prioritization by being configured to determine whether PRS signals reflected by an RO will enhance positioning performance for the UE, and prioritizing PRS signals associated with any RO that will enhance positioning performance.

Clause 21. The UE of clause 20.5, wherein whether PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

Clause 22. The UE of any of clauses 20.5-21, wherein the at least one processor is configured to determine whether PRS signals reflected by the RO will enhance positioning performance for the UE by being configured to determine that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determine an Angle of Departure (AoD) for the RO and whether the AoD is directed towards the UE.

Clause 23. The UE of any of clauses 20.5-22, wherein the at least one processor is configured to determine whether PRS signals reflected by the RO will enhance positioning performance for the UE by being configured to receive a request from a network entity to measure multipath components of a PRS resource associated with the RO, or receive an expected signal strength uncertainty window for measuring multipath components of a PRS resource associated with the RO, or determine the UE is capable of multipath detection and reporting.

Clause 24. The UE of any of clauses 20-23, wherein the at least one processor is configured to determine the prioritization for PRS signals for the at least one of measurement, reporting, or the combination thereof, based at least on the information for the one or more ROs is based on a number of ROs associated with the PRS resource, PRS resource set, TRP, or a combination thereof.

Clause 25. The UE of any of clauses 16-24, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

Clause 26. The UE of clause 25, wherein the one or more ROs are associated with multiple PRS resources, and wherein the multiple PRS resources are prioritized based on the prioritization of the RO to which they are associated.

Clause 27. The UE of any of clauses 25-26, wherein the prioritization of the one or more ROs is provided based on an ordering of the ROs in a list of ROs or an identified prioritization configuration.

Clause 28. The UE of any of clauses 25-27, wherein the prioritization of the one or more ROs is at least one of dynamically configured, or semi-statically configured.

Clause 29. The UE of any of clauses 25-28, wherein the positioning assistance data comprising the prioritization of the one or more ROs is unicast or broadcast.

Clause 30. The UE of any of clauses 25-29, wherein the prioritization of the one or more ROs is different for at least one of different positioning methods, positioning modes, or a combination thereof.

Clause 31. A user equipment (UE) in a wireless network configured for position determination of the UE, comprising: means for receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and means for performing PRS measurements or reporting the PRS measurements or a combination thereof based on at least the prioritization of the PRS signals.

Clause 32. The UE of clause 31, wherein the one or more ROs comprise one or more Reconfiguration Intelligent Surfaces (RISs).

Clause 33. The UE of any of clauses 31-32, wherein the information for the one or more ROs comprises a prioritization of multiple ROs associated with at least one PRS resource.

Clause 34. The UE of clause 33, further comprising means for determining the prioritization for the multiple ROs associated with the at least one PRS resource based at least on the information for the one or more ROs.

Clause 35. The UE of any of clauses 31-34, further comprising means for determining the prioritization for PRS signals for the at least one of measurement, reporting, or the combination thereof, based at least on the information for the one or more ROs.

Clause 35.5. The UE of clause 35, wherein the means for determining the prioritization comprises means for determining whether PRS signals reflected by an RO will enhance positioning performance for the UE, and prioritizing PRS signals associated with any RO that will enhance positioning performance.

Clause 36. The UE of clause 35.5, wherein whether the PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

Clause 37. The UE of any of clauses 35.5-36, wherein the means for determining whether the PRS signals reflected by the RO will enhance positioning performance for the UE comprises means for determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or means for determining an Angle of Departure (AoD) for the RO and whether the AoD is directed towards the UE.

Clause 38. The UE of any of clauses 35.5-37, wherein the means for determining whether the PRS signals reflected by the RO will enhance positioning performance for the UE comprises means for receiving a request from a network entity to measure multipath components of a PRS resource associated with the RO, or means for receiving an expected signal strength uncertainty window for measuring multipath components of a PRS resource associated with the RO, or means for determining the UE is capable of multipath detection and reporting.

Clause 39. The UE of any of clauses 35-38, wherein the means for determining the prioritization for PRS signals for the at least one of measurement, reporting, or the combination thereof, based at least on the information for the one or more ROs is based on a number of ROs associated with the PRS resource, PRS resource set, TRP, or a combination thereof.

Clause 40. The UE of any of clauses 31-39, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

Clause 41. The UE of clause 40, wherein the one or more ROs are associated with multiple PRS resources, and wherein the multiple PRS resources are prioritized based on the prioritization of the RO to which they are associated.

Clause 42. The UE of any of clauses 40-41, wherein the prioritization of the one or more ROs is provided based on an ordering of the ROs in a list of ROs or an identified prioritization configuration.

Clause 43. The UE of any of clauses 40-42, wherein the prioritization of the one or more ROs is at least one of dynamically configured, or semi-statically configured.

Clause 44. The UE of any of clauses 40-43, wherein the positioning assistance data comprising the prioritization of the one or more ROs is unicast or broadcast.

Clause 45. The UE of any of clauses 40-44, wherein the prioritization of the one or more ROs is different for at least one of different positioning methods, positioning modes, or a combination thereof.

Clause 46. A non-transitory computer-readable storage medium including program code stored thereon, the program code is operable to configure at least one processor in a user equipment (UE) in a wireless network for position determination of the UE, the program code comprising instructions to: receive positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and perform PRS measurements or reporting the PRS measurements or a combination thereof based on at least the prioritization of the PRS signals.

Clause 47. The non-transitory computer-readable storage medium of clause 46, wherein the one or more ROs comprise one or more Reconfiguration Intelligent Surfaces (RISs).

Clause 48. The non-transitory computer-readable storage medium of any of clauses 46-47, wherein the information for the one or more ROs comprises a prioritization of multiple ROs associated with at least one PRS resource.

Clause 49. The non-transitory computer-readable storage medium of clause 48, wherein the program code further comprises instructions to determine the prioritization for the multiple ROs associated with the at least one PRS resource based at least on the information for the one or more ROs.

Clause 50. The non-transitory computer-readable storage medium of any of clauses 46-49, wherein the program code further comprises instructions to determine the prioritization for PRS signals for the at least one of measurement, reporting, or the combination thereof, based at least on the information for the one or more ROs.

Clause 50.5. The non-transitory computer-readable storage medium of clause 50, wherein the instructions to determine the prioritization comprises instructions to determine whether PRS signals reflected by an RO will enhance positioning performance for the UE, and prioritizing PRS signals associated with any RO that will enhance positioning performance.

Clause 51. The non-transitory computer-readable storage medium of clause 50.5, wherein whether the PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

Clause 52. The non-transitory computer-readable storage medium of any of clauses 50.5-51, wherein the instructions to determine whether the PRS signals reflected by the RO will enhance positioning performance for the UE further comprises instructions to determine that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determine an Angle of Departure (AoD) for the RO and whether the AoD is directed towards the UE.

Clause 53. The non-transitory computer-readable storage medium of any of clauses 50.5-52, wherein the instructions to determine whether the PRS signals reflected by the RO will enhance positioning performance for the UE further comprises instructions to receive a request from a network entity to measure multipath components of a PRS resource associated with the RO, or receive an expected signal strength uncertainty window for measuring multipath components of a PRS resource associated with the RO, or determine the UE is capable of multipath detection and reporting.

Clause 54. The non-transitory computer-readable storage medium of any of clauses 50-53, wherein the instructions to determine the prioritization for PRS signals for the at least one of measurement, reporting, or the combination thereof, based at least on the information for the one or more ROs is based on a number of ROs associated with the PRS resource, PRS resource set, TRP, or a combination thereof.

Clause 55. The non-transitory computer-readable storage medium of any of clauses 46-54, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

Clause 56. The non-transitory computer-readable storage medium of clause 55, wherein the one or more ROs are associated with multiple PRS resources, and wherein the multiple PRS resources are prioritized based on the prioritization of the RO to which they are associated.

Clause 57. The non-transitory computer-readable storage medium of any of clauses 55-56, wherein the prioritization of the one or more ROs is provided based on an ordering of the ROs in a list of ROs or an identified prioritization configuration.

Clause 58. The non-transitory computer-readable storage medium of any of clauses 55-57, wherein the prioritization of the one or more ROs is at least one of dynamically configured, or semi-statically configured.

Clause 59. The non-transitory computer-readable storage medium of any of clauses 55-58, wherein the positioning assistance data comprising the prioritization of the one or more ROs is unicast or broadcast.

Clause 60. The non-transitory computer-readable storage medium of any of clauses 55-59, wherein the prioritization of the one or more ROs is different for at least one of different positioning methods, positioning modes, or a combination thereof.

Clause 61. A method performed by a location server in a wireless network for position determination of a user equipment (UE), comprising: sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receiving a report of measurements of PRS signals from the UE, wherein at least one of the measurements of the PRS signals performed by the UE, the report of the measurements of the PRS signals, or a combination thereof are prioritized based at least on the prioritization of the PRS signals.

Clause 62. The method of clause 61, wherein the one or more ROs comprise one or more Reconfiguration Intelligent Surfaces (RISs).

Clause 63. The method of any of clauses 61-62, wherein the information for the one or more ROs comprises a prioritization of multiple ROs associated with the at least one PRS resource.

Clause 64. The method of clause 63, wherein the UE determines the prioritization for the multiple ROs associated with one PRS resource based at least on the information for the one or more ROs.

Clause 65. The method of any of clauses 61-64, wherein the prioritization for PRS signals for the at least one of measurement, reporting, or the combination thereof, is determined based at least on the information for the one or more ROs.

Clause 66. The method of clause 65, wherein prioritization for PRS signals for the at least one of measurement, reporting, or the combination thereof, is determined based on whether PRS signals associated with an RO will enhance positioning performance for the UE.

Clause 67. The method of clause 66, wherein whether PRS signals associated with the RO will enhance positioning performance for the UE is determined based on the UE being configured with at least one of a pathloss reference signal, a spatial Rx reference signal, a Quasi Colocation (QCL) reference signal, or a combination thereof that includes the RO to be included in the determination of at least one of, pathloss measurement, a Rx beam, a QCL beam, or a combination thereof or determining an Angle of Departure (AoD) for the RO and whether the AoD is directed towards the UE.

Clause 68. The method of any of clauses 66-67, further comprising: sending a request to measure multipath components of one or more PRS resources; wherein whether PRS signals associated with any RO will enhance positioning performance for the UE is determined based on the request to measure the multipath components of a PRS resource that is associated with the RO.

Clause 69. The method of any of clauses 66-68, further comprising: sending an expected signal strength uncertainty window for measuring multipath components of one or more PRS resources; wherein whether PRS signals associated with any RO will enhance positioning performance for the UE is determined based on the expected signal strength uncertainty window for measuring the multipath components of a PRS resource that is associated with the RO.

Clause 70. The method of any of clauses 66-69, wherein whether PRS signals associated with any RO will enhance positioning performance for the UE is determined based on the UE being capable of multipath detection and reporting.

Clause 71. The method of any of clauses 66-70, wherein prioritization for PRS signals for the at least one of measurement, reporting, or the combination thereof, is determined based at least on the information for the one or more ROs is based on a number of ROs associated with the PRS resource, PRS resource set, TRP, or a combination thereof.

Clause 72. The method of any of clauses 61-71, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

Clause 73. The method of clause 72, wherein the one or more ROs are associated with multiple PRS resources, and wherein the multiple PRS resources are prioritized based on the prioritization of the RO to which they are associated.

Clause 74. The method of any of clauses 72-73, wherein the prioritization of the one or more ROs is provided based on one or more of an ordering of the ROs in a list of ROs or an identified prioritization configuration, a dynamic configuration, a semi-static configuration, or a combination thereof.

Clause 75. The method of any of clauses 72-74, wherein the positioning assistance data comprising the prioritization of the one or more ROs is unicast or broadcast.

Clause 76. The method of any of clauses 72-75, wherein the prioritization of the one or more ROs is different for at least one of different positioning methods, positioning modes, or a combination thereof.

Clause 77. A location server in a wireless network configured for position determination of a user equipment (UE), comprising: an external interface transceiver configured to wirelessly communicate with entities in a wireless network; at least one memory; and at least one processor coupled to the external interface and the at least one memory and configured to: send, via the external interface, positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receive, via the external interface, a report of measurements of PRS signals from the UE, wherein at least one of the measurements of the PRS signals performed by the UE, the report of the measurements of the PRS signals, or a combination thereof are prioritized based at least on the prioritization of the PRS signals.

Clause 78. The location server of clause 77, wherein the one or more ROs comprise one or more Reconfiguration Intelligent Surfaces (RISs).

Clause 79. The location server of any of clauses 77-78, wherein the information for the one or more ROs comprises a prioritization of multiple ROs associated with the at least one PRS resource.

Clause 80. The location server of clause 79, wherein the UE determines the prioritization for the multiple ROs associated with one PRS resource based at least on the information for the one or more ROs.

Clause 81. The location server of any of clauses 77-80, wherein the prioritization for PRS signals for the at least one of measurement, reporting, or the combination thereof, is determined based at least on the information for the one or more ROs.

Clause 82. The location server of clause 81, wherein prioritization for PRS signals for the at least one of measurement, reporting, or the combination thereof, is determined based on whether PRS signals associated with an RO will enhance positioning performance for the UE.

Clause 83. The location server of clause 82, wherein whether PRS signals associated with the RO will enhance positioning performance for the UE is determined based on the UE being configured with at least one of a pathloss reference signal, a spatial Rx reference signal, a Quasi Colocation (QCL) reference signal, or a combination thereof that includes the RO to be included in the determination of at least one of, pathloss measurement, a Rx beam, a QCL beam, or a combination thereof or determining an Angle of Departure (AoD) for the RO and whether the AoD is directed towards the UE.

Clause 84. The location server of any of clauses 82-83, wherein the at least one processor is further configured to: send, via the external interface, a request to measure multipath components of one or more PRS resources; wherein whether PRS signals associated with any RO will enhance positioning performance for the UE is determined based on the request to measure the multipath components of a PRS resource that is associated with the RO.

Clause 85. The location server of any of clauses 82-84, wherein the at least one processor is further configured to: send, via the external interface, an expected signal strength uncertainty window for measuring multipath components of one or more PRS resources; wherein whether PRS signals associated with any RO will enhance positioning performance for the UE is determined based on the expected signal strength uncertainty window for measuring the multipath components of a PRS resource that is associated with the RO.

Clause 86. The location server of any of clauses 82-85, wherein whether PRS signals associated with any RO will enhance positioning performance for the UE is determined based on the UE being capable of multipath detection and reporting.

Clause 87. The location server of any of clauses 82-86, wherein prioritization for PRS signals for the at least one of measurement, reporting, or the combination thereof, is determined based at least on the information for the one or more ROs is based on a number of ROs associated with the PRS resource, PRS resource set, TRP, or a combination thereof.

Clause 88. The location server of any of clauses 77-87, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

Clause 89. The location server of clause 88, wherein the one or more ROs are associated with multiple PRS resources, and wherein the multiple PRS resources are prioritized based on the prioritization of the RO to which they are associated.

Clause 90. The location server of any of clauses 88-89, wherein the prioritization of the one or more ROs is provided based on one or more of an ordering of the ROs in a list of ROs or an identified prioritization configuration, a dynamic configuration, a semi-static configuration, or a combination thereof.

Clause 91. The location server of any of clauses 88-90, wherein the positioning assistance data comprising the prioritization of the one or more ROs is unicast or broadcast.

Clause 92. The location server of any of clauses 88-91, wherein the prioritization of the one or more ROs is different for at least one of different positioning methods, positioning modes, or a combination thereof.

Clause 93. A location server in a wireless network configured for position determination of a user equipment (UE), comprising: means for sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and means for receiving a report of measurements of PRS signals from the UE, wherein at least one of the measurements of the PRS signals performed by the UE, the report of the measurements of the PRS signals, or a combination thereof are prioritized based at least on the prioritization of the PRS signals.

Clause 94. The location server of clause 93, wherein the one or more ROs comprise one or more Reconfiguration Intelligent Surfaces (RISs).

Clause 95. The location server of any of clauses 93-94, wherein the information for the one or more ROs comprises a prioritization of multiple ROs associated with the at least one PRS resource.

Clause 96. The location server of clause 95, wherein the UE determines the prioritization for the multiple ROs associated with one PRS resource based at least on the information for the one or more ROs.

Clause 97. The location server of any of clauses 93-96, wherein the prioritization for PRS signals for the at least one of measurement, reporting, or the combination thereof, is determined based at least on the information for the one or more ROs.

Clause 98. The location server of clause 97, wherein prioritization for PRS signals for the at least one of measurement, reporting, or the combination thereof, is determined based on whether PRS signals associated with an RO will enhance positioning performance for the UE.

Clause 99. The location server of clause 98, wherein whether PRS signals associated with the RO will enhance positioning performance for the UE is determined based on the UE being configured with at least one of a pathloss reference signal, a spatial Rx reference signal, a Quasi Colocation (QCL) reference signal, or a combination thereof that includes the RO to be included in the determination of at least one of, pathloss measurement, a Rx beam, a QCL beam, or a combination thereof or determining an Angle of Departure (AoD) for the RO and whether the AoD is directed towards the UE.

Clause 100. The location server of any of clauses 98-99, further comprising: means for sending a request to measure multipath components of one or more PRS resources; wherein whether PRS signals associated with any RO will enhance positioning performance for the UE is determined based on the request to measure the multipath components of a PRS resource that is associated with the RO.

Clause 101. The location server of any of clauses 98-100, further comprising: means for sending an expected signal strength uncertainty window for measuring multipath components of one or more PRS resources; wherein whether PRS signals associated with any RO will enhance positioning performance for the UE is determined based on the expected signal strength uncertainty window for measuring the multipath components of a PRS resource that is associated with the RO.

Clause 102. The location server of any of clauses 98-101, wherein whether PRS signals associated with any RO will enhance positioning performance for the UE is determined based on the UE being capable of multipath detection and reporting.

Clause 103. The location server of any of clauses 98-102, wherein prioritization for PRS signals for the at least one of measurement, reporting, or the combination thereof, is determined based at least on the information for the one or more ROs is based on a number of ROs associated with the PRS resource, PRS resource set, TRP, or a combination thereof.

Clause 104. The location server of any of clauses 93-103, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

Clause 105. The location server of clause 104, wherein the one or more ROs are associated with multiple PRS resources, and wherein the multiple PRS resources are prioritized based on the prioritization of the RO to which they are associated.

Clause 106. The location server of any of clauses 104-105, wherein the prioritization of the one or more ROs is provided based on one or more of an ordering of the ROs in a list of ROs or an identified prioritization configuration, a dynamic configuration, a semi-static configuration, or a combination thereof.

Clause 107. The location server of any of clauses 104-106, wherein the positioning assistance data comprising the prioritization of the one or more ROs is unicast or broadcast.

Clause 108. The location server of any of clauses 104-107, wherein the prioritization of the one or more ROs is different for at least one of different positioning methods, positioning modes, or a combination thereof.

Clause 109. A non-transitory computer-readable storage medium including program code stored thereon, the program code is operable to configure at least one processor in a location server in a wireless network for position determination of a user equipment (UE), the program code comprising instructions to: send positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receive a report of measurements of PRS signals from the UE, wherein at least one of the measurements of the PRS signals performed by the UE, the report of the measurements of the PRS signals, or a combination thereof are prioritized based at least on the prioritization of the PRS signals.

Clause 110. The non-transitory computer-readable storage medium of clause 109, wherein the one or more ROs comprise one or more Reconfiguration Intelligent Surfaces (RISs).

Clause 111. The non-transitory computer-readable storage medium of any of clauses 109-110, wherein the information for the one or more ROs comprises a prioritization of multiple ROs associated with the at least one PRS resource.

Clause 112. The non-transitory computer-readable storage medium of clause 111, wherein the UE determines the prioritization for the multiple ROs associated with one PRS resource based at least on the information for the one or more ROs.

Clause 113. The non-transitory computer-readable storage medium of any of clauses 109-112, wherein the prioritization for PRS signals for the at least one of measurement, reporting, or the combination thereof, is determined based at least on the information for the one or more ROs.

Clause 114. The non-transitory computer-readable storage medium of clause 113, wherein prioritization for PRS signals for the at least one of measurement, reporting, or the combination thereof, is determined based on whether PRS signals associated with an RO will enhance positioning performance for the UE.

Clause 115. The non-transitory computer-readable storage medium of clause 114, wherein whether PRS signals associated with the RO will enhance positioning performance for the UE is determined based on the UE being configured with at least one of a pathloss reference signal, a spatial Rx reference signal, a Quasi Colocation (QCL) reference signal, or a combination thereof that includes the RO to be included in the determination of at least one of, pathloss measurement, a Rx beam, a QCL beam, or a combination thereof or determining an Angle of Departure (AoD) for the RO and whether the AoD is directed towards the UE.

Clause 116. The non-transitory computer-readable storage medium of any of clauses 114, wherein the program code further comprises instructions to: send a request to measure multipath components of one or more PRS resources; wherein whether PRS signals associated with any RO will enhance positioning performance for the UE is determined based on the request to measure the multipath components of a PRS resource that is associated with the RO.

Clause 117. The non-transitory computer-readable storage medium of any of clauses 114-116, wherein the program code further comprise instructions to: send an expected signal strength uncertainty window for measuring multipath components of one or more PRS resources; wherein whether PRS signals associated with any RO will enhance positioning performance for the UE is determined based on the expected signal strength uncertainty window for measuring the multipath components of a PRS resource that is associated with the RO.

Clause 118. The non-transitory computer-readable storage medium of any of clauses 114-117, wherein whether PRS signals associated with any RO will enhance positioning performance for the UE is determined based on the UE being capable of multipath detection and reporting.

Clause 119. The non-transitory computer-readable storage medium of any of clauses 114-118, wherein prioritization for PRS signals for the at least one of measurement, reporting, or the combination thereof, is determined based at least on the information for the one or more ROs is based on a number of ROs associated with the PRS resource, PRS resource set, TRP, or a combination thereof.

Clause 120. The non-transitory computer-readable storage medium of any of clauses 109-119, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

Clause 121. The non-transitory computer-readable storage medium of clause 120, wherein the one or more ROs are associated with multiple PRS resources, and wherein the multiple PRS resources are prioritized based on the prioritization of the RO to which they are associated.

Clause 122. The non-transitory computer-readable storage medium of any of clauses 120-121, wherein the prioritization of the one or more ROs is provided based on one or more of an ordering of the ROs in a list of ROs or an identified prioritization configuration, a dynamic configuration, a semi-static configuration, or a combination thereof.

Clause 123. The non-transitory computer-readable storage medium of any of clauses 120-122, wherein the positioning assistance data comprising the prioritization of the one or more ROs is unicast or broadcast.

Clause 124. The non-transitory computer-readable storage medium of any of clauses 120-123, wherein the prioritization of the one or more ROs is different for at least one of different positioning methods, positioning modes, or a combination thereof.

Clause 125. A method performed by a user equipment (UE) in a wireless network for position determination of the UE, comprising: receiving positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs; and performing PRS measurements of PRS signals based on the determined at least one of positioning accuracy requirements, measurement accuracy, or a combination thereof.

Clause 126. The method of clause 125, further comprising determining the at least one of positioning accuracy requirements, measurement accuracy, or the combination thereof for the PRS resources based at least in part on an association with ROs.

Clause 127. The method of clause 126, wherein determining the at least one of positioning accuracy requirements, measurement accuracy, or the combination thereof for the PRS resources is further based whether the UE supports multipath detection and reporting.

Clause 128. The method of any of clauses 125-127, wherein the at least one of positioning accuracy requirements, measurement accuracy, or the combination thereof comprises accuracy requirements for measurement of at least one of Angle of Arrival (AoA), Angle of Departure (AoD), Reference Signal Received Power (RSRP), Reference Signal Time Difference (RSTD), or a combination thereof.

Clause 129. The method of any of clauses 125-128, wherein the one or more ROs comprise one or more Reconfiguration Intelligent Surfaces (RISs).

Clause 130. The method of clause 129, wherein the at least one of positioning accuracy requirements, measurement accuracy, or the combination thereof for PRS resources is further based on whether the RIS is ON.

Clause 131. The method of clause 130, wherein the at least one of positioning accuracy requirements, measurement accuracy, or the combination thereof for PRS resources does not apply for PRS resources associated with an RIS that is ON.

Clause 132. The method of any of clauses 126-131, wherein the at least one of positioning accuracy requirements, measurement accuracy, or the combination thereof for PRS resources is based on whether PRS signals reflected by an RO will enhance positioning performance for the UE.

Clause 133. The method of clause 132, wherein whether the PRS signals reflected by the RO will enhance positioning performance for the UE is determined based on reflection properties of the RO comprising at least one of Angle of Arrival (AoA), Angle of Departure (AoD), Transmission (Tx) power, Tx beam information, or a combination thereof.

Clause 134. The method of any of clauses 132-133, wherein the at least one of positioning accuracy requirements, measurement accuracy, or the combination thereof is different for ROs that reflect PRS signals that will enhance positioning performance for the UE and ROs that reflect PRS signals that will not enhance positioning performance for the UE.

Clause 135. A user equipment (UE) in a wireless network configured for position determination of the UE, comprising: a wireless transceiver configured to wirelessly communicate with entities in a wireless network; at least one memory; and at least one processor coupled to the wireless transceiver and the at least one memory and configured to: receive, via the wireless transceiver, positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs; and perform PRS measurements of PRS signals based on the determined at least one of positioning accuracy requirements, measurement accuracy, or a combination thereof.

Clause 136. The UE of clause 135, wherein the at least one processor is further configured to determine the at least one of positioning accuracy requirements, measurement accuracy, or the combination thereof for the PRS resources based at least in part on an association with ROs.

Clause 137. The UE of clause 136, wherein the at least one processor is configured to determine the at least one of positioning accuracy requirements, measurement accuracy, or the combination thereof for the PRS resources further based whether the UE supports multipath detection and reporting.

Clause 138. The UE of any of clauses 135-137, wherein the at least one of positioning accuracy requirements, measurement accuracy, or the combination thereof comprises accuracy requirements for measurement of at least one of Angle of Arrival (AoA), Angle of Departure (AoD), Reference Signal Received Power (RSRP), Reference Signal Time Difference (RSTD), or a combination thereof.

Clause 139. The UE of any of clauses 135-138, wherein the one or more ROs comprise one or more Reconfiguration Intelligent Surfaces (RISs).

Clause 140. The UE of clause 139, wherein the at least one of positioning accuracy requirements, measurement accuracy, or the combination thereof for PRS resources is further based on whether the RIS is ON.

Clause 141. The UE of clause 140, wherein the at least one of positioning accuracy requirements, measurement accuracy, or the combination thereof for PRS resources does not apply for PRS resources associated with an RIS that is ON.

Clause 142. The UE of any of clauses 136-141, wherein the at least one of positioning accuracy requirements, measurement accuracy, or the combination thereof for PRS resources based on whether PRS signals reflected by an RO will enhance positioning performance for the UE.

Clause 143. The UE of clause 142, wherein whether the RO associated with the PRS resource is reflecting PRS signals that will enhance positioning performance for the UE is determined based on reflection properties of the RO comprising at least one of Angle of Arrival (AoA), Angle of Departure (AoD), Transmission (Tx) power, Tx beam information, or a combination thereof.

Clause 144. The UE of any of clauses 142-143, wherein the at least one of positioning accuracy requirements, measurement accuracy, or the combination thereof is different for ROs that reflect PRS signals that will enhance positioning performance for the UE and ROs that reflect PRS signals that will not enhance positioning performance for the UE.

Clause 145. A user equipment (UE) in a wireless network configured for position determination of the UE, comprising: means for receiving positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs; and means for performing PRS measurements of PRS signals based on the determined at least one of positioning accuracy requirements, measurement accuracy, or a combination thereof.

Clause 146. The UE of clause 145, further comprising means for determining the at least one of positioning accuracy requirements, measurement accuracy, or the combination thereof for the PRS resources based at least in part on an association with ROs.

Clause 147. The UE of clause 146, wherein the means for determining the at least one of positioning accuracy requirements, measurement accuracy, or the combination thereof for the PRS resources is further based whether the UE supports multipath detection and reporting.

Clause 148. The UE of any of clauses 145-147, wherein the at least one of positioning accuracy requirements, measurement accuracy, or the combination thereof comprises accuracy requirements for measurement of at least one of Angle of Arrival (AoA), Angle of Departure (AoD), Reference Signal Received Power (RSRP), Reference Signal Time Difference (RSTD), or a combination thereof.

Clause 149. The UE of any of clauses 145-148, wherein the one or more ROs comprise one or more Reconfiguration Intelligent Surfaces (RISs).

Clause 150. The UE of clause 149, wherein the at least one of positioning accuracy requirements, measurement accuracy, or the combination thereof for PRS resources is further based on whether the RIS is ON.

Clause 151. The UE of clause 150, wherein the at least one of positioning accuracy requirements, measurement accuracy, or the combination thereof for PRS resources does not apply for PRS resources associated with an RIS that is ON.

Clause 152. The UE of any of clauses 146-151, wherein the at least one of positioning accuracy requirements, measurement accuracy, or the combination thereof for PRS resources is based on whether PRS signals reflected by an RO will enhance positioning performance for the UE.

Clause 153. The UE of clause 152, wherein whether the PRS signals reflected by the RO will enhance positioning performance for the UE is determined based on reflection properties of the RO comprising at least one of Angle of Arrival (AoA), Angle of Departure (AoD), Transmission (Tx) power, Tx beam information, or a combination thereof.

Clause 154. The UE of any of clauses 152-153, wherein the at least one of positioning accuracy requirements, measurement accuracy, or the combination thereof is different for ROs that reflect PRS signals that will enhance positioning performance for the UE and ROs that reflect PRS signals that will not enhance positioning performance for the UE.

Clause 155. A non-transitory computer-readable storage medium including program code stored thereon, the program code is operable to configure at least one processor in a user equipment (UE) in a wireless network for position determination of the UE, the program code comprising instructions to: receive positioning assistance data comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein at least one of positioning accuracy requirements, measurement accuracy, or a combination thereof for PRS resources is based at least in part on an association with ROs; and perform PRS measurements of PRS signals based on the determined at least one of positioning accuracy requirements, measurement accuracy, or a combination thereof.

Clause 156. The non-transitory computer-readable storage medium of clause 155, wherein the program code further comprises instructions to determine the at least one of positioning accuracy requirements, measurement accuracy, or the combination thereof for the PRS resources based at least in part on an association with ROs.

Clause 157. The non-transitory computer-readable storage medium of clause 156, wherein the instructions to determine the at least one of positioning accuracy requirements, measurement accuracy, or the combination thereof for the PRS resources is further based whether the UE supports multipath detection and reporting.

Clause 158. The non-transitory computer-readable storage medium of any of clauses 155-157, wherein the at least one of positioning accuracy requirements, measurement accuracy, or the combination thereof comprises accuracy requirements for measurement of at least one of Angle of Arrival (AoA), Angle of Departure (AoD), Reference Signal Received Power (RSRP), Reference Signal Time Difference (RSTD), or a combination thereof.

Clause 159. The non-transitory computer-readable storage medium of any of clauses 155-158, wherein the one or more ROs comprise one or more Reconfiguration Intelligent Surfaces (RISs).

Clause 160. The non-transitory computer-readable storage medium of clause 159, wherein the at least one of positioning accuracy requirements, measurement accuracy, or the combination thereof for PRS resources is further based on whether the RIS is ON.

Clause 161. The non-transitory computer-readable storage medium of clause 160, wherein the at least one of positioning accuracy requirements, measurement accuracy, or the combination thereof for PRS resources does not apply for PRS resources associated with an RIS that is ON.

Clause 162. The non-transitory computer-readable storage medium of any of clauses 156-161, wherein the at least one of positioning accuracy requirements, measurement accuracy, or the combination thereof for PRS resources is based on whether PRS signals reflected by an RO will enhance positioning performance for the UE.

Clause 163. The non-transitory computer-readable storage medium of clause 162, wherein whether the PRS signals reflected by the RO will enhance positioning performance for the UE is determined based on reflection properties of the RO comprising at least one of Angle of Arrival (AoA), Angle of Departure (AoD), Transmission (Tx) power, Tx beam information, or a combination thereof.

Clause 164. The non-transitory computer-readable storage medium of any of clauses 162-163, wherein the at least one of positioning accuracy requirements, measurement accuracy, or the combination thereof is different for ROs that reflect PRS signals that will enhance positioning performance for the UE and ROs that reflect PRS signals that will not enhance positioning performance for the UE.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) in a wireless network for position determination of the UE, comprising:

receiving positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and performing PRS measurements or reporting the PRS measurements or a combination thereof based on at least the prioritization of the PRS signals.

2. The method of claim 1, wherein the one or more ROs comprise one or more Reconfiguration Intelligent Surfaces (RISs).

3. The method of claim 1, wherein the information for the one or more ROs comprises a prioritization of multiple ROs associated with at least one PRS resource.

4. The method of claim 1, further comprising determining the prioritization for PRS signals for the at least one of measurement, reporting, or the combination thereof, based at least on the information for the one or more ROs.

5. The method of claim 4, wherein determining the prioritization comprises determining whether PRS signals reflected by an RO will enhance positioning performance for the UE, and prioritizing PRS signals associated with any RO that will enhance positioning performance.

6. The method of claim 5, wherein whether the PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

7. The method of claim 5, wherein determining whether the PRS signals reflected by the RO will enhance positioning performance for the UE comprises determining that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determining an Angle of Departure (AoD) for the RO and whether the AoD is directed towards the UE.

8. The method of claim 5, wherein determining whether the PRS signals reflected by the RO will enhance positioning performance for the UE comprises at least one of receiving a request from a network entity to measure multipath components of a PRS resource associated with the RO, receiving an expected signal strength uncertainty window for measuring multipath components of a PRS resource associated with the RO, determining the UE is capable of multipath detection and reporting, or a combination thereof.

9. The method of claim 4, wherein determining the prioritization for PRS signals for the at least one of measurement, reporting, or the combination thereof, based at least on the information for the one or more ROs is based on a number of ROs associated with the PRS resource, PRS resource set, TRP, or a combination thereof.

10. The method of claim 1, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

11. The method of claim 10, wherein the one or more ROs are associated with multiple PRS resources, and wherein the multiple PRS resources are prioritized based on the prioritization of the RO to which they are associated.

12. A user equipment (UE) in a wireless network configured for position determination of the UE, comprising:

a wireless transceiver configured to wirelessly communicate with entities in a wireless network;

at least one memory; and at least one processor coupled to the wireless transceiver and the at least one memory and configured to:

receive, via the wireless transceiver, positioning assistance data comprising information for one or more Positioning Reference Signal (PRS) resources, one or more PRS resource sets for one or more transmission reception points (TRPs), or a combination thereof, the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and perform PRS measurements or reporting the PRS measurements or a combination thereof based on at least the prioritization of the PRS signals.

13. The UE of claim 12, wherein the one or more ROs comprise one or more Reconfiguration Intelligent Surfaces (RISs).

14. The UE of claim 12, wherein the information for the one or more ROs comprises a prioritization of multiple ROs associated with at least one PRS resource.

15. The UE of claim 12, wherein the at least one processor is further configured to determine the prioritization for PRS signals for the at least one of measurement, reporting, or the combination thereof, based at least on the information for the one or more ROs.

16. The UE of claim 15, wherein the at least one processor is configured to determine the prioritization by being configured to determine whether PRS signals reflected by an RO will enhance positioning performance for the UE, and prioritizing PRS signals associated with any RO that will enhance positioning performance.

17. The UE of claim 16, wherein whether the PRS signals reflected by the RO will enhance positioning performance for the UE is determined based on reflection properties of the RO comprising at least one of Angle of Arrival, Angle of Departure, Transmission (Tx) power, Tx beam information, or a combination thereof.

18. The UE of claim 16, wherein the at least one processor is configured to determine whether the PRS signals reflected by the RO will enhance positioning performance for the UE by being configured to determine that the UE is configured with at least one of a pathloss reference signal, a spatial Rx reference signal, a Quasi Colocation (QCL) reference signal, or a combination thereof that includes the RO to be included in the determination of at least one of a pathloss measurement, a Rx beam, a QCL beam, or a combination thereof or determine an Angle of Departure (AoD) for the RO and whether the AD is directed towards the UE.

19. The UE of claim 16, wherein the at least one processor is configured to determine whether the PRS signals reflected by the RO will enhance positioning performance for the UE by being configured to receive a request from a network entity to measure multipath components of a PRS resource associated with the RO, or receive an expected signal strength uncertainty window for measuring multipath components of a PRS resource associated with the RO, or determine the UE is capable of multipath detection and reporting.

20. The UE of claim 15, wherein the at least one processor is configured to determine the prioritization for PRS signals for the at least one of measurement, reporting, or the combination thereof, based at least on the information for the one or more ROs is based on a number of ROs associated with the PRS resource, PRS resource set, TRP, or a combination thereof.

21. The UE of claim 12, wherein the information for the one or more PRS resources, the one or more PRS resource sets, the one or more TRPs, or the combination thereof further comprises a prioritization of one or more ROs, and wherein the prioritization for PRS signals for the at least one of measurement, reporting, or the combination thereof is further based at least on the prioritization of the one or more ROs.

22. The UE of claim 21, wherein the one or more ROs are associated with multiple PRS resources, and wherein the multiple PRS resources are prioritized based on the prioritization of the RO to which they are associated.

23. A method performed by a location server in a wireless network for position determination of a user equipment (UE), comprising:

sending positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receiving a report of measurements of PRS signals from the UE, wherein at least one of the measurements of the PRS signals performed by the UE, the report of the measurements of the PRS signals, or a combination thereof are prioritized based at least on the prioritization of the PRS signals.

24. The method of claim 23, wherein the one or more ROs comprise one or more Reconfiguration Intelligent Surfaces (RISs).

25. The method of claim 23, wherein the information for the one or more ROs comprises a prioritization of multiple ROs associated with the at least one PRS resource.

26. The method of claim 23, wherein the prioritization for PRS signals for the at least one of measurement, reporting, or the combination thereof is determined based at least on the information for the one or more ROs.

27. The method of claim 26, wherein prioritization for PRS signals for the at least one of measurement, reporting, or the combination thereof, is determined based on whether PRS signals associated with an RO will enhance positioning performance for the UE.

28. The method of claim 27, wherein whether PRS signals associated with the RO will enhance positioning performance for the UE is determined based on the UE being configured with at least one of a pathloss reference signal, a spatial Rx reference signal, a Quasi Colocation (QCL) reference signal, or a combination thereof that includes the RO to be included in the determination of at least one of, pathloss measurement, a Rx beam, a QCL beam, or a combination thereof or determining an Angle of Departure (AoD) for the RO and whether the AoD is directed towards the UE.

29. The method of claim 27, further comprising:

sending a request to measure multipath components of one or more PRS resources;

wherein whether PRS signals associated with any RO will enhance positioning performance for the UE is determined based on the request to measure the multipath components of a PRS resource that is associated with the RO.

30. The method of claim 27, further comprising:

sending an expected signal strength uncertainty window for measuring multipath components of one or more PRS resources;

wherein whether PRS signals associated with any RO will enhance positioning performance for the UE is determined based on the expected signal strength uncertainty window for measuring the multipath components of a PRS resource that is associated with the RO.

31. The method of claim 27, wherein whether PRS signals associated with any RO will enhance positioning performance for the UE is determined based on the UE being capable of multipath detection and reporting.

32. The method of claim 27, wherein prioritization for PRS signals for the at least one of measurement, reporting, or the combination thereof, is determined based at least on the information for the one or more ROs is based on a number of ROs associated with the PRS resource, PRS resource set, TRP, or a combination thereof.

33. The method of claim 23, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

34. The method of claim 33, wherein the one or more ROs are associated with multiple PRS resources, and wherein the multiple PRS resources are prioritized based on the prioritization of the RO to which they are associated.

35. A location server in a wireless network configured for position determination of a user equipment (UE), comprising:

an external interface transceiver configured to wirelessly communicate with entities in a wireless network;

at least one memory; and at least one processor coupled to the external interface and the at least one memory and configured to:

send, via the external interface, positioning assistance data to the UE comprising information for one or more Positioning Reference Signal (PRS) resources, one or more PRS resource sets for one or more transmission reception points (TRPs), the positioning assistance data comprising information for one or more Reflection Objects (ROs) associated with one or more PRS resources, PRS resource sets, TRPs, or a combination thereof, wherein a prioritization of PRS signals for at least one of measurement, reporting, or a combination thereof, is based at least on the information for the one or more ROs; and receive, via the external interface, a report of measurements of PRS signals from the UE, wherein at least one of the measurements of the PRS signals performed by the UE, the report of the measurements of the PRS signals, or a combination thereof are prioritized based at least on the prioritization of the PRS signals.

36. The location server of claim 35, wherein the prioritization for PRS signals for the at least one of measurement, reporting, or the combination thereof, is based at least on the information for the one or more ROs.

37. The location server of claim 36, wherein prioritization for PRS signals for the at least one of measurement, reporting, or the combination thereof, is determined based on whether PRS signals associated with an RO will enhance positioning performance for the UE.

38. The location server of claim 35, wherein the information for the one or more PRS resource, the one or more PRS resource sets, the one or more TRPs, or the combination thereof further comprises a prioritization of one or more ROs, and wherein determining the prioritization for PRS signals for the at least one of measurement, reporting, or the combination thereof is based at least on the prioritization of the one or more ROs.

* * * * *